US008313368B2

(12) United States Patent
Filipour et al.

(10) Patent No.: US 8,313,368 B2
(45) Date of Patent: Nov. 20, 2012

(54) GAMING SYSTEMS, GAMING DEVICES AND METHODS WITH NON-COMPETITIVE PLAY AND OPTIONAL COMPETITIVE PLAY

(75) Inventors: Cameron A. Filipour, Las Vegas, NV (US); Dwayne A. Davis, Reno, NV (US)

(73) Assignee: IGT, Reno, NV (US)

( * ) Notice: Subject to any disclaimer, the term of this patent is extended or adjusted under 35 U.S.C. 154(b) by 255 days.

(21) Appl. No.: 12/709,126

(22) Filed: Feb. 19, 2010

(65) Prior Publication Data

US 2011/0207523 A1 Aug. 25, 2011

(51) Int. Cl.
*A63F 13/00* (2006.01)

(52) U.S. Cl. ........................................... 463/20; 463/43

(58) Field of Classification Search ............. 463/25–42, 463/43; 273/292
See application file for complete search history.

(56) References Cited

U.S. PATENT DOCUMENTS 5,393,057 A 2/1995 Marnell, II
5,564,700 A 10/1996 Celona
5,936,661 A 8/1999 Trew
6,174,237 B1 1/2001 Stephenson
6,217,448 B1 4/2001 Olsen
6,312,334 B1 11/2001 Yoseloff
6,328,649 B1 12/2001 Randall et al.
6,406,369 B1 6/2002 Baerlocher et al.
6,425,824 B1 7/2002 Baerlocher et al.
6,595,853 B1 * 7/2003 Osawa ........................... 463/20
6,605,047 B2 8/2003 Zarins et al.
6,638,164 B2 10/2003 Randall et al.
6,645,075 B1 11/2003 Gatto et al.
6,656,048 B2 12/2003 Olsen
6,726,565 B2 4/2004 Hughs-Baird
6,780,110 B2 8/2004 Baerlocher et al.
6,837,793 B2 1/2005 McClintic
6,840,856 B2 1/2005 Setern (Continued)

FOREIGN PATENT DOCUMENTS

WO 98/14898 4/1998

(Continued)

OTHER PUBLICATIONS

Letter from Reina Kakimoto of Mots Law dated Oct. 25, 2011 regarding Third Party Submission Filed for U.S. Appl. No. 12/709,126. (1 page).

(Continued)

*Primary Examiner* — Masud Ahmed
(74) *Attorney, Agent, or Firm* — Neal, Gerber & Eisenberg LLP

(57) ABSTRACT

In an embodiment, a gaming system includes a plurality of gaming devices and a controller configured to communicate with the gaming devices. The gaming system enables a plurality of players to play an interactive game in a non-competitive mode and in a competitive mode. If at least two players play the interactive game in the competitive mode, for a competitive wagering event, which includes a competition between two players, the gaming system determines a winning player and a losing player. The gaming system causes the winning player to contribute a winning player portion toward a wager associated with the competitive wagering event and causes the losing player to contribute a losing player portion toward the wager associated with the competitive wagering event. The losing player portion is less than the winning player portion. The gaming system randomly determines and provides any awards to the winning player based on the wager.

22 Claims, 21 Drawing Sheets

U.S. PATENT DOCUMENTS 6,902,478 B2 6/2005 McClintic
6,971,954 B2 12/2005 Randall et al.
7,029,395 B1 4/2006 Baerlocher
7,037,192 B2 5/2006 Baerlocher et al.
7,070,505 B2 7/2006 Vancura et al.
7,077,744 B2 7/2006 Cannon
7,081,050 B2 7/2006 Tarantino
7,201,657 B2 4/2007 Baerlocher et al.
7,291,067 B2 11/2007 Tarantino
7,311,598 B2 12/2007 Kaminkow et al.
7,311,604 B2 12/2007 Kaminkow et al.
7,314,408 B2 1/2008 Cannon
7,314,410 B2 1/2008 Baerlocher et al.
7,326,115 B2 2/2008 Baerlocher
7,329,179 B2 2/2008 Baerlocher
7,351,140 B2 4/2008 Wolf et al.
7,351,146 B2 4/2008 Kaminkow
7,357,714 B2 4/2008 Tessmer et al.
7,361,087 B2 4/2008 Baerlocher et al.
7,387,570 B2 6/2008 Randall
7,393,280 B2 7/2008 Cannon
7,427,236 B2 9/2008 Kaminkow et al.
7,448,949 B2 11/2008 Kaminkow et al.
7,465,227 B2 12/2008 Baerlocher
7,470,185 B2 12/2008 Baerlocher
7,488,251 B2 2/2009 Kaminkow
7,500,915 B2 3/2009 Wolf et al.
7,549,919 B1 6/2009 Nathan et al.
7,918,736 B2 * 4/2011 Walker et al. .................. 463/42
2003/0125103 A1 7/2003 Tessmer et al.
2003/0144053 A1 7/2003 Michaelson
2004/0063492 A1 4/2004 Baerlocher et al.
2004/0171350 A1 9/2004 Le et al.
2004/0204218 A1 10/2004 Hughs-Baird
2004/0259625 A1 12/2004 Randall
2005/0054429 A1 3/2005 Baerlocher et al.
2005/0060050 A1 3/2005 Baerlocher
2005/0096114 A1 5/2005 Cannon et al.
2005/0192087 A1 9/2005 Friedman et al.
2005/0282625 A1 12/2005 Nicely
2006/0025195 A1 2/2006 Pennington et al.
2006/0030399 A1 2/2006 Baerlocher
2006/0040723 A1 2/2006 Baerlocher et al.
2006/0040732 A1 2/2006 Baerlocher et al.
2006/0040733 A1 2/2006 Baerlocher et al.
2006/0040734 A1 2/2006 Baerlocher et al.
2006/0040736 A1 2/2006 Baerlocher et al.
2006/0128457 A1 6/2006 Cannon
2006/0281526 A1 * 12/2006 Hornik et al. .................. 463/20
2007/0054726 A1 3/2007 Muir et al.
2007/0054732 A1 3/2007 Baerlocher
2007/0054733 A1 3/2007 Baerlocher
2007/0077990 A1 4/2007 Cuddy et al.
2007/0082725 A1 4/2007 Low et al.
2007/0105619 A1 5/2007 Kniesteadt et al.
2007/0105620 A1 5/2007 Cuddy et al.
2007/0135208 A1 6/2007 Betteridge, IV
2007/0149270 A1 6/2007 Baerlocher et al.
2007/0149292 A1 6/2007 Kaminkow et al.
2007/0155485 A1 7/2007 Cuddy et al.
2007/0167217 A1 7/2007 Kaminkow et al.
2007/0167239 A1 7/2007 O'Rourke
2007/0298875 A1 12/2007 Baerlocher et al.
2008/0000825 A1 1/2008 Roberts et al.
2008/0020817 A1 1/2008 Kaminkow et al.
2008/0020822 A1 1/2008 Cuddy et al.
2008/0020823 A1 1/2008 Cuddy et al.
2008/0020824 A1 1/2008 Cuddy et al.
2008/0020829 A1 1/2008 Baerlocher
2008/0020847 A1 1/2008 Kniesteadt et al.
2008/0032764 A1 2/2008 Cannon
2008/0051168 A1 2/2008 Kaminkow et al.
2008/0070676 A1 3/2008 Baerlocher et al.
2008/0070677 A1 3/2008 Baerlocher et al.
2008/0070678 A1 3/2008 Baerlocher et al.
2008/0070702 A1 3/2008 Kaminkow et al.
2008/0081690 A1 4/2008 Baerlocher et al.
2008/0081691 A1 4/2008 Baerlocher et al.
2008/0102916 A1 5/2008 Kovacs et al.
2008/0102920 A1 5/2008 Baerlocher
2008/0102934 A1 5/2008 Tan
2008/0108401 A1 5/2008 Baerlocher et al.
2008/0108406 A1 5/2008 Oberberger
2008/0108425 A1 5/2008 Oberberger
2008/0108429 A1 5/2008 Davis et al.
2008/0113759 A1 5/2008 Baerlocher
2008/0113765 A1 5/2008 DeWaal
2008/0113768 A1 5/2008 Baerlocher
2008/0113771 A1 5/2008 Baerlocher et al.
2008/0119283 A1 5/2008 Baerlocher
2008/0132320 A1 6/2008 Rodgers
2008/0139274 A1 6/2008 Baerlocher
2008/0139290 A1 6/2008 Kniesteadt et al.
2008/0153564 A1 6/2008 Baerlocher et al.
2008/0167108 A1 7/2008 Baerlocher et al.
2008/0176650 A1 7/2008 Wolf et al.
2008/0182650 A1 7/2008 Randall et al.
2008/0182655 A1 7/2008 DeWaal et al.
2008/0194316 A1 8/2008 Baerlocher
2008/0214280 A1 9/2008 Baerlocher
2008/0234034 A1 9/2008 Tessmer et al.
2008/0274790 A1 11/2008 Cannon
2008/0300050 A1 12/2008 Tessmer et al.
2008/0311980 A1 12/2008 Cannon
2008/0318668 A1 12/2008 Ching et al.
2009/0042644 A1 2/2009 Zielinski
2009/0061991 A1 3/2009 Popovich et al.
2009/0069073 A1 3/2009 Gerrard et al.
2009/0088253 A1 * 4/2009 Oberberger et al. ............ 463/42
2009/0104977 A1 4/2009 Zielinski
2009/0111560 A1 4/2009 Davis et al.
2009/0111573 A1 4/2009 Iddings
2009/0117970 A1 5/2009 DeWaal et al.
2009/0117979 A1 5/2009 Decasa, Jr. et al.
2009/0124320 A1 5/2009 DeWaal
2009/0124327 A1 5/2009 Caputo et al.
2009/0124362 A1 5/2009 Cuddy et al.
2009/0124363 A1 5/2009 Baerlocher et al.
2009/0124385 A1 5/2009 Cuddy et al.
2009/0143133 A1 6/2009 Baerlocher
2009/0221342 A1 * 9/2009 Katz et al. ....................... 463/17
2009/0275404 A1 * 11/2009 Kromydas ...................... 463/29
2010/0197385 A1 * 8/2010 Aoki et al. ...................... 463/27

FOREIGN PATENT DOCUMENTS

WO 9851384 11/1998

OTHER PUBLICATIONS

Third Party Submission in Published Application Under 37 C.F.R. 1.99 for U.S. Appl. No. 12/709,126, dated Oct. 25, 2011. (3 pages).

* cited by examiner

FIG. 3H
16,18
62
76
PLAYER #1
Wagering Credits
Wager Component
Credits Won
Points Won
490
120
64
66
68
75
63
Non-Competitive Mode
PLAYER #2
Wagering Credits
Wager Component
Credits Won
Points Won
490
120
20
78
80
82
85
Non-Competitive Mode
73
93
Congratulations Player #2!
You shot an asteroid.
You win an award of 120 credits.
You also win an award of 20 points.
88
76
86

GAMING SYSTEMS, GAMING DEVICES AND METHODS WITH NON-COMPETITIVE PLAY AND OPTIONAL COMPETITIVE PLAY

COPYRIGHT NOTICE

A portion of the disclosure of this patent document contains material which is subject to copyright protection. The copyright owner has no objection to the photocopy reproduction of the patent document or the patent disclosure in exactly the form it appears in the Patent and Trademark Office patent file or records, but otherwise reserves all copyright rights whatsoever.

BACKGROUND

Gaming devices which provide players awards in primary or base games are well known. Gaming devices generally require the player to place or make a wager to activate the primary or base game. In many of these gaming devices, the award is based on the player obtaining a winning symbol or symbol combination and on the amount of the wager (e.g., the higher the wager, the higher the award). Symbols or symbol combinations which are less likely to occur usually provide higher awards.

In such known gaming devices, the amount of the wager made on the primary game by the player may vary. For instance, the gaming device may enable the player to wager a minimum number of credits, such as one credit (e.g., one penny, nickel, dime, quarter or dollar) up to a maximum number of credits, such as five credits. This wager may be made by the player a single time or multiple times in a single play of the primary game. For instance, a slot game may have one or more paylines and the slot game may enable the player to make a wager on each payline in a single play of the primary game. Thus, it is known that a gaming device, such as a slot game, may enable players to make wagers of substantially different amounts on each play of the primary or base game ranging, for example, from 1 credit up to 125 credits (e.g., 5 credits on each of 25 separate paylines). Accordingly, it should be appreciated that different players play at substantially different wagering amounts or levels and at substantially different rates of play.

Secondary or bonus games are also known in gaming devices. The secondary or bonus games usually provide an additional award to the player. Secondary or bonus games usually do not require an additional wager by the player to be activated. Many secondary or bonus games are generally activated or hit upon an occurrence of a designated triggering symbol or triggering symbol combination in the primary or base game. For instance, a bonus symbol occurring on the payline on the third reel of a three reel slot machine may hit the secondary bonus game. Part of the enjoyment and excitement of playing certain gaming devices is the occurrence or triggering of the secondary or bonus game (even before the player knows how much the bonus award will be).

Other known games include non-wagering video games, such as pinball games, fighting games, sports games, puzzle games, word games, trivia games or domino games. Such non-wagering video games require the player(s) to make one or more inputs using one or more different player skills such as physical skill or mental skill. Games truly based on player skill or strategy enables certain players to become professionals at such games.

Games of skill are popular among certain players because those players feel a competitive edge while playing. That is, these players enjoy the feeling that a personal strength could lead to them winning one or more awards or prizes. However, certain gaming jurisdictions have not approved gaming devices which incorporate one or more elements of skill as a factor in determining whether to provide any awards to the player. Additionally, such gaming devices are often not as popular with lesser skilled or experienced players who feel disadvantaged while playing against more skilled or experienced players. Moreover, in these gaming devices, the probability of each award or outcome being generated is based on one or more aspects of player skill (which varies from player to player) and is thus somewhat less predictable on average.

There is a continuing need to provide new and different gaming devices and gaming systems which incorporate one or more aspects of skill in determining which awards are provided to players. There is also a continuing need to provide new and different gaming devices and gaming systems which cater to higher skilled players while still accommodating lesser skilled players when determining which awards are provided to such players.

SUMMARY

Various embodiments of the present disclosure provide a gaming system including a controller and two or more gaming devices which are configured to enable two or more players to play an interactive game (such as a skill based interactive game) in a non-competitive mode and enable each of those players to selectively play the interactive game in a competitive mode. When multiple players select to play the interactive game in the competitive mode, the gaming system, for a competitive wagering event, which includes a competition between the players, determines a winning player of the competitive wagering event and a losing player of the competitive wagering event. The gaming system causes the winning player to contribute a winning player portion toward a wager associated with the competitive wagering event and causes the losing player to contribute a losing player portion toward the wager associated with the competitive wagering event. The losing player portion is less than the winning player portion. The gaming system determines if any award results from the competitive wagering event based on a random determination and provides any determined award to the winning player. Despite contributing a greater portion to the wager for the competitive wagering, the winning player may benefit by obtaining any award resulting from the wager that includes a contribution made by the losing player.

In another embodiment, instead of determining the respective winning and losing player contributions to the wager based on the result of the competitive wagering event, the gaming system determines the respective winning and losing player award portions based on the result of the competitive wagering event. That is, for the competitive wagering event, the gaming system determines a winning player of the competitive wagering event and a losing player of the competitive wagering event. The gaming system causes the winning player to contribute an amount toward a wager associated with the competitive wagering event, and causes the losing player to contribute the same amount toward the wager associated with the competitive wagering event, and randomly determines if the wager results in a winning player award portion, and results in any losing player award portion. Any determined losing player award portion is less than any determined winning player award portion. The gaming system provides any winning player award portion to the winning player and any losing player award portion to the losing player. Despite winning only a portion of an award, the winning player may benefit by obtaining an award portion resulting from the wager that includes a contribution made by the losing player.

In another embodiment, instead of determining the respective winning player and losing player wager contributions or award portions based on the result of the competitive wagering event, the gaming system determines respective winning player and losing player probabilities of receiving a communal award based on the result of the competitive wagering event. In this embodiment, the gaming system determines for each player, an initial player award probability of a communal award. For the competitive wagering event, the gaming system determines a winning player of the competitive wagering event and a losing player of the competitive wagering event. The gaming system causes a transfer of part of the losing player award probability to the winning player award probability for the competitive wagering event, which results in new winning player and losing player award probabilities for receiving the communal award. The gaming system repeats the matching of two players in a competitive wagering events for a designated number of competitive wagering events until an award generating triggering event occurs. Upon the occurrence of the award generating triggering event, the gaming system selects a player to provide the communal award, and provides the communal award to the selected player. The probability of being the selected player which receives the communal award is based on that player's award probability. Thus, a player's award probability of the communal award increases for each competitive wagering event that player wins, which increases the likelihood of that player receiving the communal award.

In various example embodiments, for each player playing the interactive game in the non-competitive mode, the gaming system provides a plurality of wagering events. For each wagering event that occurs for each player, the gaming system causes a wager to be placed by the player for that wagering event, determines an outcome for the wagering event, and randomly determines any awards to provide the player based on the outcome and the wager.

In various embodiments, the gaming system includes a plurality of gaming devices and a different player at each of the plurality of gaming devices. For each gaming device, the gaming system enables the player of that gaming device to place a wager to play the interactive game. The wager includes a plurality of wager components. For each wagering event and competitive wagering event that occurs at each gaming device, the gaming system causes one or a portion of one of the plurality of wager components to be wagered on the interactive game, determines an outcome for the wagering event, and randomly determines any awards to provide the player resulting from the outcome and the wager component.

Additional features and advantages are described in, and will be apparent from, the following Detailed Description and the figures.

DETAILED DESCRIPTION

The present disclosure may be implemented in various configurations for gaming machines, gaming devices, or gaming systems, including but not limited to: (1) a dedicated gaming machine, gaming device, or gaming system wherein the computerized instructions for controlling any games (which are provided by the gaming machine or gaming device) are provided with the gaming machine or gaming device prior to delivery to a gaming establishment; and (2) a changeable gaming machine, gaming device, or gaming system wherein the computerized instructions for controlling any games (which are provided by the gaming machine or gaming device) are downloadable to the gaming machine or gaming device through a data network after the gaming machine or gaming device is in a gaming establishment. In one embodiment, the computerized instructions for controlling any games are executed by at least one central server, central controller, or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller, or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
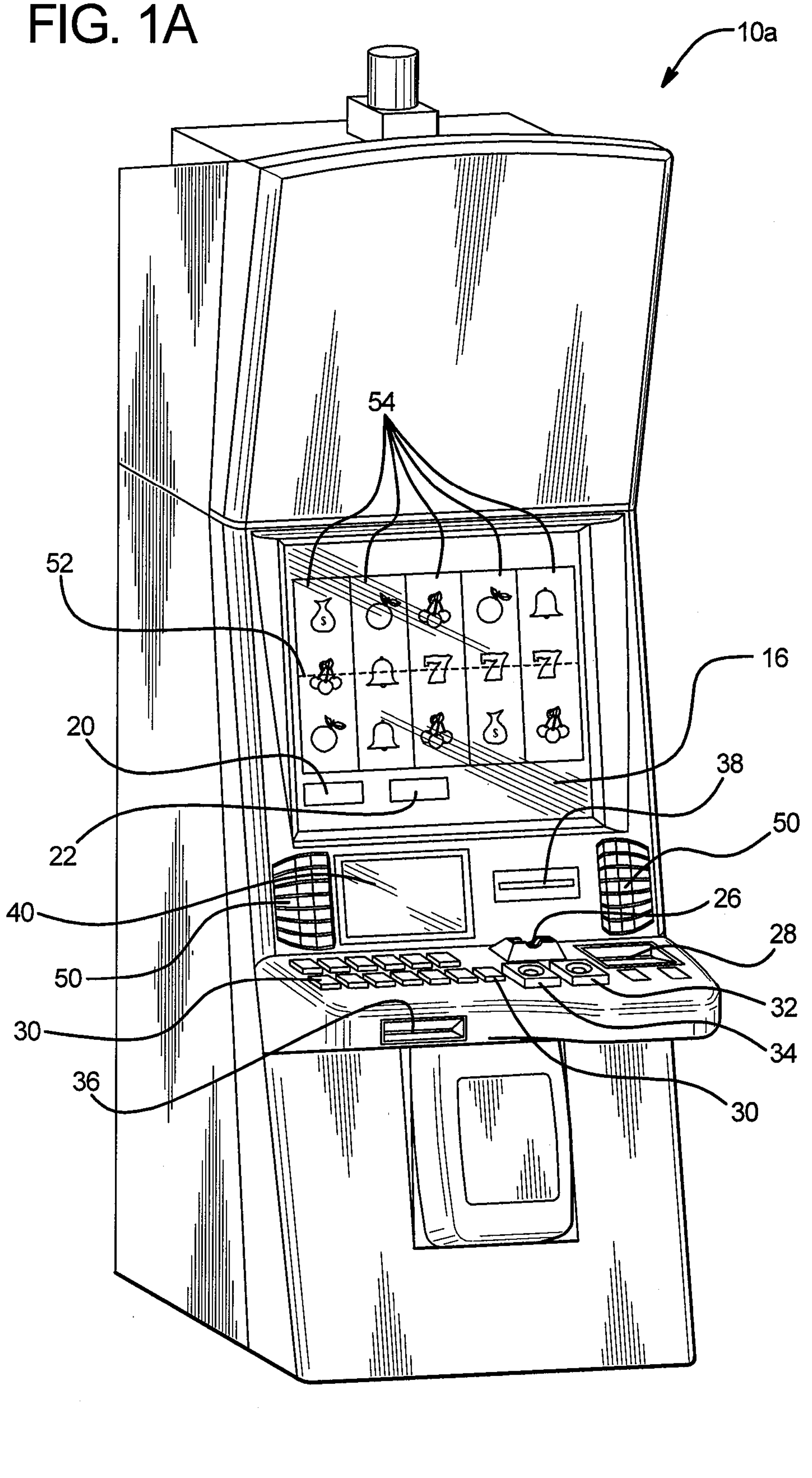
FIGS. 1A and 1B are perspective views of example alternative embodiments of the gaming device of the present disclosure.
Figure 1B:
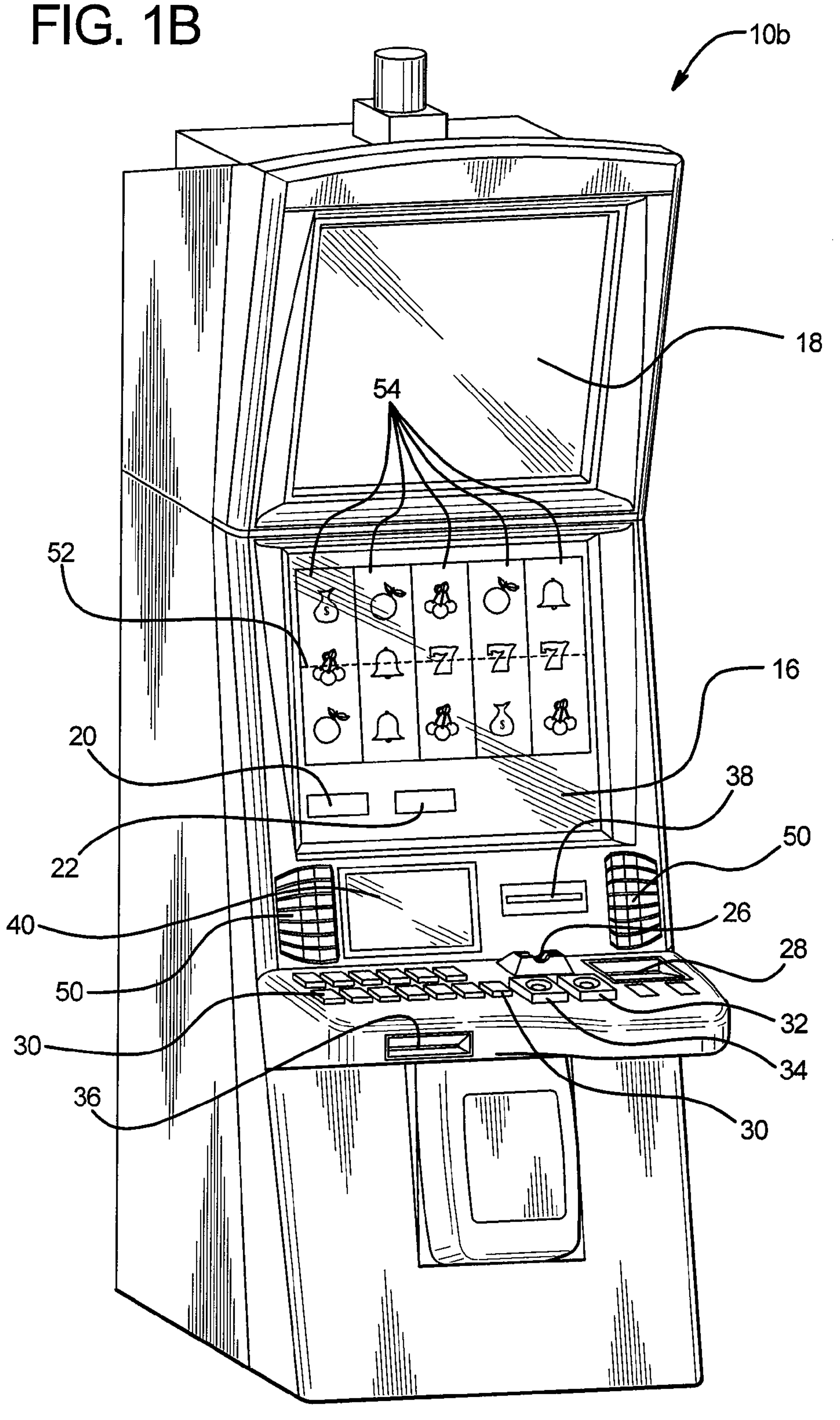

Referring now to the drawings, two example alternative embodiments of a gaming device disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing, or cabinet which provides support for a plurality of displays, inputs, controls, and other features of a conventional gaming machine. It is configured so that a player can operate it while standing or sitting. The gaming device can be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
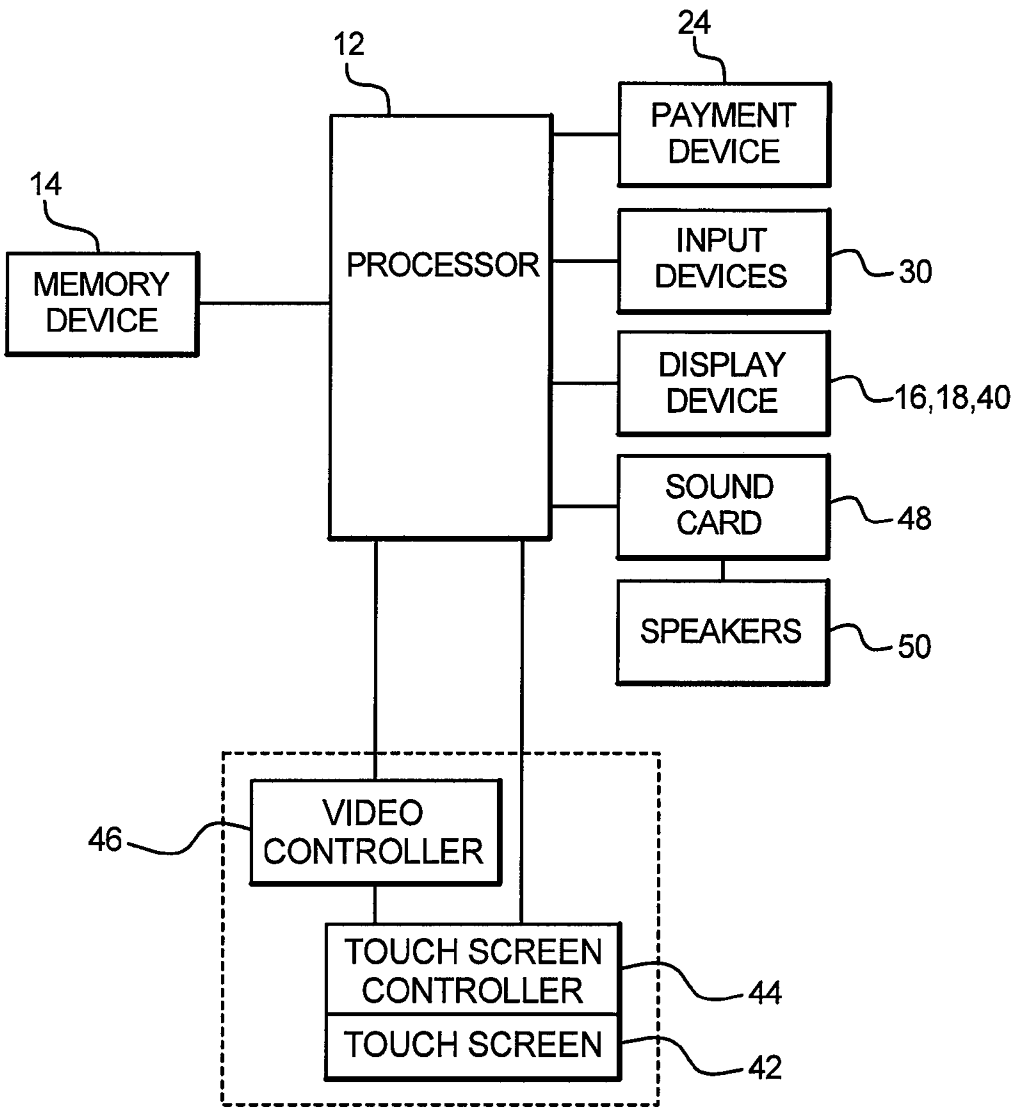
FIG. 2A is a schematic block diagram of one embodiment of an electronic configuration for one of the gaming devices disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information, and applicable game rules that relate to the play of the gaming device. In one embodiment, the memory device includes random access memory (RAM), which can include non-volatile RAM (NVRAM), magnetic RAM (MRAM), ferroelectric RAM (FeRAM), and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical, and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD, or USB memory device. In other embodiments, part or all of the program code and/or operating data described above can be downloaded to the memory device through a suitable network.

In one embodiment, an operator or a player can use such a removable memory device in a desktop computer, a laptop computer, a personal digital assistant (PDA), a portable computing device, or another computerized platform to implement the present disclosure. In one embodiment, the gaming device or gaming machine disclosed herein is operable over a wireless network, for example part of a wireless gaming system. In this embodiment, the gaming machine may be a hand-held device, a mobile device, or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator, or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted on the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance, or the equivalent. In one embodiment, the gaming device includes a bet display 22 which displays a player's amount wagered. In one embodiment, as described in more detail below, the gaming device includes a player tracking display 40 which displays information regarding a player's play tracking status.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual, or video reels and wheels, dynamic lighting, video images, images of people, characters, places, things, faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels, or dice, configured to display at least one or a plurality of game or other suitable images, symbols or indicia.

As illustrated in FIG. 2A, in one embodiment, the gaming device includes at least one payment device 24 in communication with the processor. As seen in FIGS. 1A and 1B, a payment device such as a payment acceptor includes a note, ticket or bill acceptor 28 wherein the player inserts paper money, a ticket, or voucher and a coin slot 26 where the player inserts money, coins, or tokens. In other embodiments, payment devices such as readers or validators for credit cards, debit cards or credit slips may accept payment. In one embodiment, a player may insert an identification card into a card reader of the gaming device. In one embodiment, the identification card is a smart card having a programmed microchip, a coded magnetic strip or coded rewritable magnetic strip, wherein the programmed microchip or magnetic strips are coded with a player's identification, credit totals (or related data), and/or other relevant information. In another embodiment, a player may carry a portable device, such as a cell phone, a radio frequency identification tag, or any other suitable wireless device, which communicates a player's identification, credit totals (or related data), and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B, and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a play button 32 or a pull arm (not shown) which is used by the player to start any primary game or sequence of events in the gaming device. The play button can be any suitable play activator such as a bet one button, a max bet button, or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment, or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card or smart card, may be implemented in accordance with the gaming device disclosed herein.

In one embodiment, one input device is a joystick or control pad (not shown). Depending upon the embodiment, the gaming device includes one or more joysticks or control pads to control at least one movement of a character or object in a game environment displayed on the central display device 16 or the upper display device 18. In one embodiment, the joystick or control pad includes one or more buttons, which each perform a designated task depending upon the displayed game environment. For example, if the central display device 16 displays a shooting game environment, the player operates the joystick to control or move a player-controlled aircraft to dodge objects (e.g., such as other aircraft or asteroids) and the player operates any buttons on the joystick to shoot numerous objects (e.g., such as other aircraft or asteroids).

In one embodiment, the input devices, such as the buttons, the joystick or the control pad, enable the player to make zero, one or a plurality of inputs during the play of a game, such as a skill or partial skill-based game. That is, the input devices allow for player interaction with the images displayed in association with the game.

In one embodiment, as mentioned above and as seen in FIG. 2A, one input device is a touch-screen 42 coupled with a touch-screen controller 44 or some other touch-sensitive display overlay to allow for player interaction with the images on the display. The touch-screen and the touch-screen controller are connected to a video controller 46. A player can make decisions and input signals into the gaming device by touching the touch-screen at the appropriate locations. One such input device is a conventional touch-screen button panel.

The gaming device may further include a plurality of communication ports for enabling communication of the processor with external peripherals, such as external video sources, expansion buses, game or other displays, a SCSI port, or a keypad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as by playing music for the primary and/or secondary game or by playing music for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized to provide any appropriate information.

In one embodiment, the gaming machine may include a sensor, such as a camera, in communication with the processor (and possibly controlled by the processor), that is selectively positioned to acquire an image of a player actively using the gaming device and/or the surrounding area of the gaming device. In one embodiment, the camera may be configured to selectively acquire still or moving (e.g., video) images and may be configured to acquire the images in an analog, digital, or other suitable format. The display devices may be configured to display the image acquired by the camera as well as to display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering game as the primary or base game. The gaming machine or device may include some or all of the features of conventional gaming machines or devices. The primary or base game may comprise any suitable reel-type game, card game, cascading or falling symbol game, number game, or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, displays the plurality of simulated video reels 54. Each reel 54 displays a plurality of indicia or symbols, such as bells, hearts, fruits, numbers, letters, bars, or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device that enables wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more than one or all of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of two cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to a quantity of awards being based on how many paylines that would have passed through each of the strings of related symbols in active symbol positions).

In one embodiment, a base or primary game may be a poker game wherein the gaming device enables the player to play a conventional game of video draw poker and initially deals five cards all face up from a virtual deck of fifty-two cards. Cards may be dealt as in a traditional game of cards or in the case of the gaming device, the cards may be randomly selected from a predetermined number of cards. If the player wishes to draw, the player selects the cards to hold via one or more input devices, such as by pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the number of credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand against a payout table and awards are provided to the player.

In one embodiment, a base or primary game may be a keno game wherein the gaming device displays a plurality of selectable indicia or numbers on at least one of the display devices. In this embodiment, the player selects at least one bit potentially a plurality of the selectable indicia or numbers via an input device such as a touch screen. The gaming device then displays a series of drawn numbers and determine an amount of matches, if any, between the player's selected numbers and the gaming device's drawn numbers. The player is provided an award based on the amount of matches, if any, based on the amount of determined matches and the number of numbers drawn.

In one embodiment, in addition to winning credits or other awards in a base or primary game, the gaming device may also give players the opportunity to win credits in a bonus or secondary game or in a bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game, and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition occurs based on exceeding a certain amount of game play (such as number of games, number of credits, amount of time), or reaching a specified number of points earned during game play.

In another embodiment, the gaming device processor 12 or central controller 56 randomly provides the player one or more plays of one or more secondary games. In one such embodiment, the gaming device does not provide any apparent reason to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy-in for a bonus game is needed. That is, a player may not purchase entry into a bonus game; rather they must win or earn entry through play of the primary game, thus encouraging play of the primary game. In another embodiment, qualification of the bonus or secondary game is accomplished through a simple "buy-in" by the player—for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
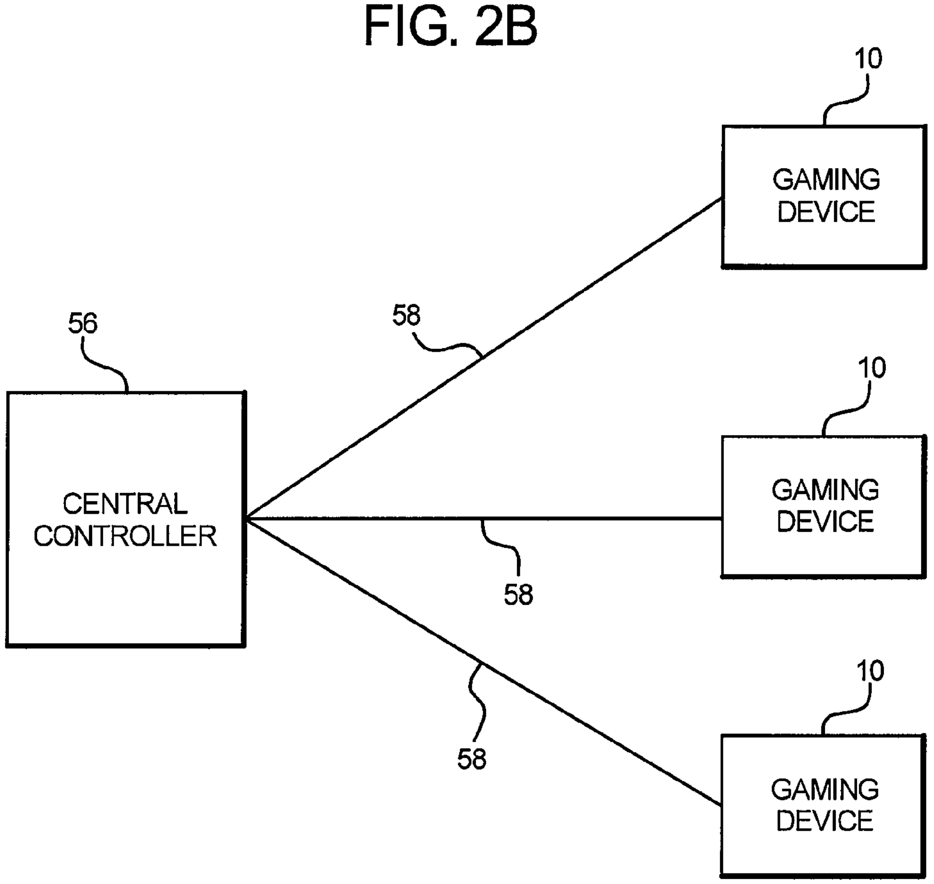
FIG. 2B is a schematic block diagram of one embodiment of a gaming system network configuration including a plurality of gaming devices disclosed herein.

In one embodiment, as illustrated in FIG. 2B, one or more of the gaming devices 10 are in communication with each other and/or at least one central controller 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands, or any other suitable data or signal between the individual gaming device and the central server. The gaming device processor is operable to execute such communicated events, messages, or commands in conjunction with the operation of the gaming device. Moreover, the processor of the central server is designed to transmit and receive events, messages, commands, or any other suitable data or signal between the central server and each of the individual gaming devices. The central server processor is operable to execute such communicated events, messages, or commands in conjunction with the operation of the central server. It should be appreciated that one, more or each of the functions of the central controller, central server or remote host as disclosed herein may be performed by one or more gaming device processors. It should be further appreciated that one, more or each of the functions of one or more gaming device processors as disclosed herein may be performed by the central controller, central server or remote host.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility, and the like.

In another embodiment, a predetermined game outcome value is determined for each of a plurality of linked or networked gaming devices based on the results of a bingo, keno, or lottery game. In this embodiment, each individual gaming device utilizes one or more bingo, keno, or lottery games to determine the predetermined game outcome value provided to the player for the interactive game played at that gaming device. In one embodiment, the bingo, keno, or lottery game is displayed to the player. In another embodiment, the bingo, keno or lottery game is not displayed to the player, but the results of the bingo, keno, or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card with each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game, and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of whether the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any player's gaming activity at the gaming device. In one such embodiment, the gaming device includes at least one card reader 38 in communication with the processor. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) which are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to one another.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer or other internet facilitator is available. The expansion in the number of computers and number and speed of internet connections in recent years increases opportunities for players to play from an ever-increasing number of remote sites. It should be appreciated that the enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server-based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, or downloading or streaming the game program over a dedicated data network, internet, or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be achieved by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as by playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Competitive Wagering Event Resulting in a Shared Wager

Various embodiments of the present disclosure provide a gaming system including a controller and two or more gaming devices which are configured to enable a plurality of players to each play an interactive game in a non-competitive mode and enable each of those players to selectively play the interactive game in a competitive mode against one or more players. In one embodiment, the interactive game involves skill or partial skill requiring one or more inputs from a player using the input device, such as the joystick or control pad described above, to control an object. When two players select to play the interactive game in the competitive mode, the gaming system matches those players and, for a competitive wagering event in the interactive game, which includes a competition between players, determines a winning player of the competitive wagering event and a losing player of the competitive wagering event.

In one embodiment, the gaming system causes the winning player to contribute a winning player wager portion toward a wager associated with the competitive wagering event and causes the losing player to contribute a losing player wager portion toward the wager associated with the competitive wagering event. The losing player wager portion is less than the winning player wager portion. The gaming system randomly determines any award for the competitive wagering event based in part on the wager and provides any determined award to the winning player.

FIGS. 3A to 3J illustrates one example embodiment in which two players play an interactive outer space shooting game in the non-competitive mode and select to play the interactive outer space shooting game in the competitive mode. The interactive game involves skill which requires each player to make one or more inputs using the input device, such as the joystick or control pad to control an object. Each player places an initial wager to play the interactive game. Each player also selects an amount or component of their initial wager that will automatically be wagered on each wagering event that occurs in the interactive game (i.e., a wager component). It should be appreciated that in the example embodiments described herein, the gaming system enables each of the players to place an initial wager amount to play the interactive game and to select a wager component that will automatically be wagered on each wagering event. In one embodiment, the gaming system enables the player to select the wager component denomination. For example, the gaming enables the player to select among ½ of a cent, ¼ of a cent, $0.01, $0.05, $0.10, $0.25, $0.75 and $1 as the wager components. In one such embodiment, the same amount of credits are wagered for every player for each wagering event. In another embodiment, the gaming system enables the player to select the number of credits to wager per wagering event. For example, the gaming system enables the player to first select the denomination of the credit and then select to wager 1, 3 or 5 credits for the wager component. In another embodiment, the denomination of the wager component remains the same, but the gaming system enables the player to select the number of credits to wager. For example, the wager denomination is $0.25, but the player may select to wager 1, 3 or 5 credits for the wager component. In other embodiments, instead of the player selecting the wager component to be wagered on each of the wagering events, the gaming system automatically divides the initial wager amount placed by a player into a plurality of wager components. The gaming system automatically places these wager components on each wagering event. It should be appreciated that the wager component described herein is further described in U.S. Patent Application Publication No. 2008/0108425 entitled, "GAMING SYSTEM AND METHOD PROVIDING AN INTERACTIVE GAME WITH AUTOMATIC WAGERS", the entire contents of which are incorporated herein.

It should be appreciated that instead of each player selecting an amount or component of their initial wager that will automatically be wagered on each wagering event that occurs in the interactive game (i.e., a wager component), in various other embodiments, the gaming system automatically determines a portion of the initial wager amount that will be wagered on each wagering event based at least in part on an amount of time that has expired since the player initially began playing the interactive game or since a previous wagering event. It should be appreciated that this method of determining a portion of the initial wager amount for each wagering event is further described in U.S. Pat. No. 6,645,075, entitled, "CASHLESS TIME GAMING", the entire contents of which are incorporated herein.

Turning more specifically to FIGS. 3A to 3J, in this illustrated example, the gaming system enables the players to select to play the interactive game in a competitive mode. The competitive mode enables the players to compete against each other in at least one competitive wagering event. When the two players are playing the interactive game in the non-competitive mode, a wagering event occurs for each of the players. For each wagering event that occurs for each of the two players, the gaming system automatically places one of the selected wager components for that player. When the two players select to play the interactive game in a competitive mode, a competitive wagering event occurs. The gaming system determines a winning player and a losing player for the competitive wagering event and causes the winning player and the losing player to each contribute toward a portion of a wager to be associated with the competitive wagering event. The portion contributed by the winning player is a portion of the winning player's wager component. The portion contributed by the losing player is a portion of a losing player's wager component. The gaming system determines any award for the competitive wagering event based on the wager and provides any determined award to the winning player.

Figure 3A:
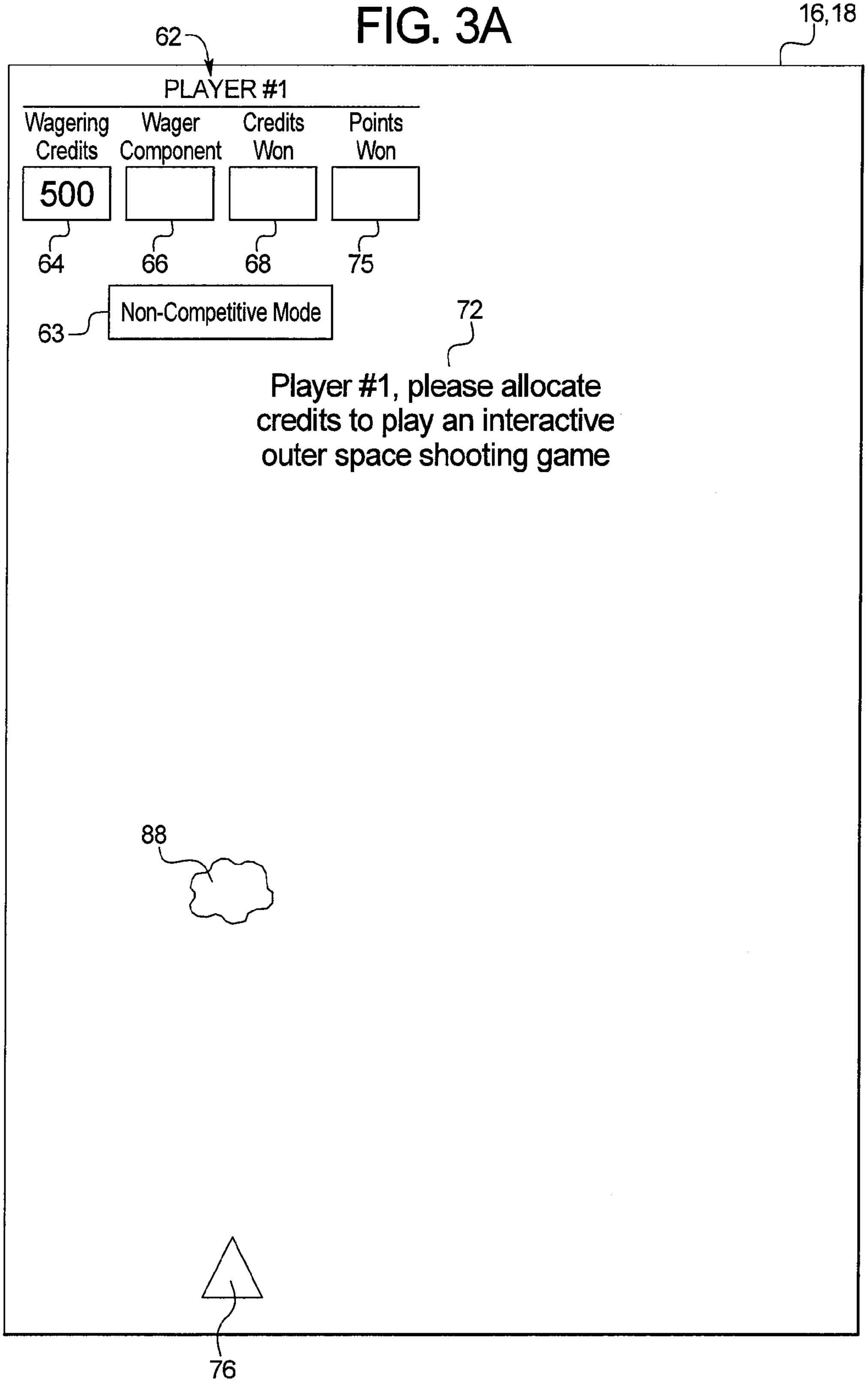
FIGS. 3A, 3B, 3C, 3D, 3E, 3F, 3G, 3H, 3I and 3J are front views of a gaming device display providing a play of an interactive game in accordance with an example of an embodiment of the gaming system disclosed herein.

More specifically, in this illustrated example embodiment, the gaming system enables a first player (i.e., player #1) to allocate credits to an interactive outer space shooting game, as illustrated by FIG. 3A. The outer space shooting game includes a player #1 controlled spaceship 76 and a plurality of game elements or objects, such as an asteroid 88. In the outer space shooting game, player #1 makes inputs to control the movement of spaceship 76 and makes inputs to try to shoot and destroy the objects using the spaceship 76.

In the example embodiments illustrated and discussed below, each wagering event occurs when a player shoots at one of the plurality of different objects, such as asteroid 88. However, it should be appreciated that in different embodiments, each wagering event occurs when a player shoots at and hits (or destroys) one of the plurality of different objects. In other words, if the player shoots at an object and misses the object, no wagering occurs in these alternative embodiments. It should also be appreciated that in various other embodiments, each wagering event occurs when a player shoots and misses one of the objects. In other words, if a player shoots and hits the object, no wagering event occurs in these alternative embodiments.

Turning again to FIGS. 3A to 3J, the gaming system enables player #1 to place a wager by displaying on display device 16, 18 message 72 of, "PLAYER #1, PLEASE ALLOCATE CREDITS TO PLAY AN INTERACTIVE OUTER SPACE TYPE SHOOTING GAME." The gaming system also displays on display device 16, 18 a display area 62 for player #1 that includes a wagering credits display 64, a wager component display 66, a credits won display 68, a points won display 75, and a competitive/non-competitive mode display 63. The wagering credits display 64 displays player #1's current number of credits, cash, account balance or the equivalent. The wager component display 66 displays an amount of a wager component or a portion of a wager component that is automatically wagered by player #1 for each wagering event or competitive wagering event that occurs in the interactive game. The credits won display 68 displays the number of credits player #1 has won and the points won display 75 displays the number of points player #1 has won. The competitive/non-competitive mode display 63 indicates the mode in which player #1 is playing the interactive game (i.e., either competitive mode or non-competitive mode).

Figure 3B:
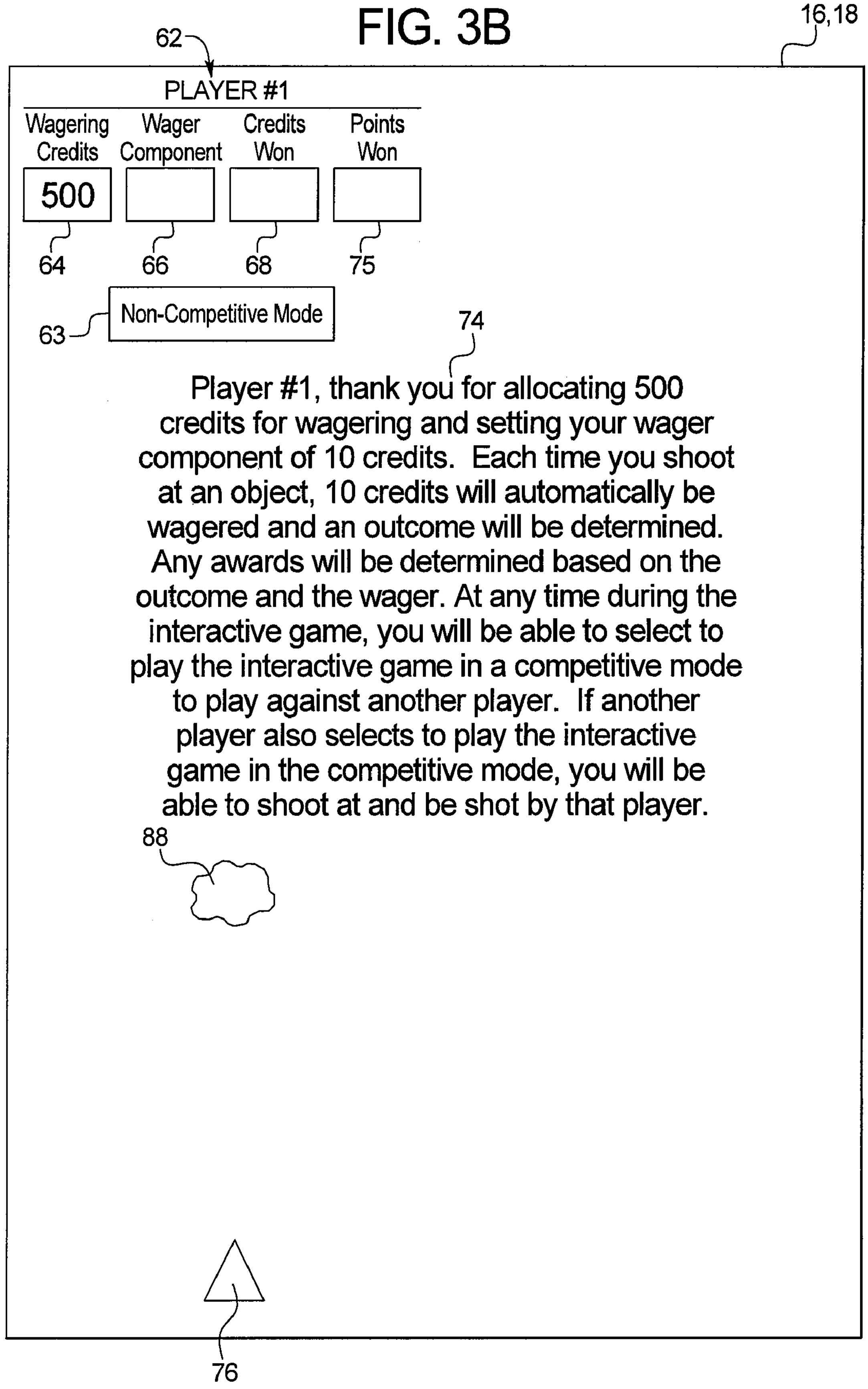

Player #1 allocates 500 credits to the interactive game and selects a wager component of 10 credits for each wagering event that will occur in the interactive game, as illustrated by FIG. 3B. In this example embodiment, each wagering event occurs when player #1 shoots at one of the plurality of different objects, such as asteroid 88. It should be appreciated that in different embodiments, each wagering event occurs when player #1 shoots and destroys one of the plurality of different objects. In other words, if the player shoots at an object and misses the object, no wagering event occurs in these different embodiments. For each wagering event that occurs, the gaming system automatically causes the selected wager component of 10 credits for player #1 to be wagered on that wagering event. The gaming system displays a message 74 of, "PLAYER #1, THANK YOU FOR YOUR ALLOCATING 500 CREDITS FOR WAGERING AND SETTING YOUR WAGER COMPONENT OF 10 CREDITS. EACH TIME YOU SHOOT AT AN OBJECT, 10 CREDITS WILL AUTOMATICALLY BE WAGERED AND AN OUTCOME WILL BE DETERMINED. ANY AWARDS WILL BE DETERMINED BASED ON THE OUTCOME. AT ANY TIME DURING THE INTERACTIVE GAME, YOU WILL BE ABLE TO SELECT TO PLAY THE INTERACTIVE GAME IN A COMPETITIVE MODE TO PLAY AGAINST ANOTHER PLAYER. IF ANOTHER PLAYER ALSO SELECTS TO PLAY THE INTERACTIVE GAME IN THE COMPETITIVE MODE, YOU WILL BE ABLE TO SHOOT AT AND BE SHOT BY THAT OTHER PLAYER" as illustrated by FIG. 3B. The gaming system also displays the current number of wagering credits of 500 for Player #1 in the wagering credits display 64.

Figure 3C:
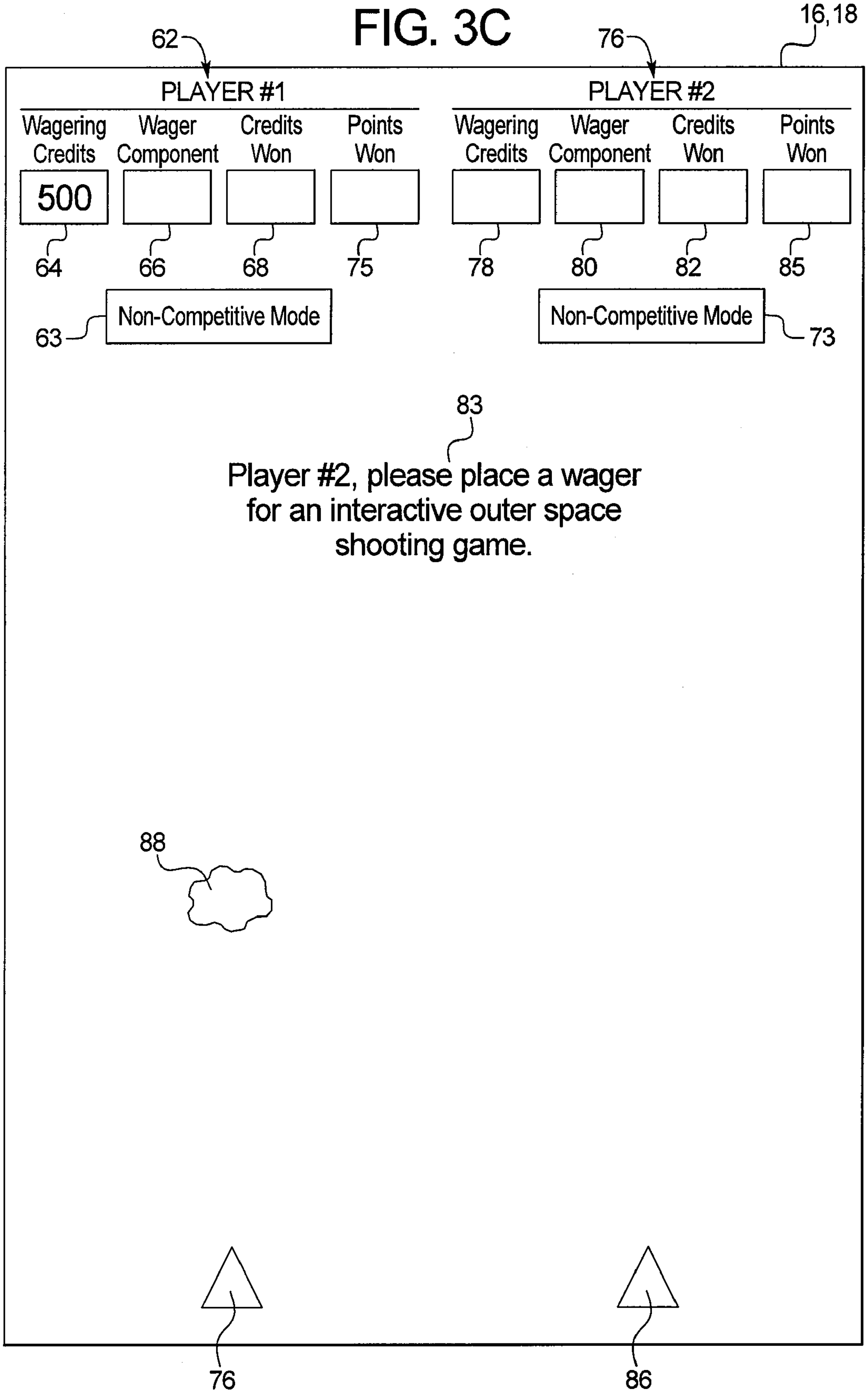

The gaming system also enables a second player (i.e., player #2) to allocate credits to an interactive outer space shooting game, as illustrated by FIG. 3C. The outer space shooting game includes a player #2 controlled spaceship 86 and a plurality of game elements or objects, such as the asteroid 88. In the outer space shooting game, player #2 makes inputs to control the movement of spaceship 86 and makes inputs to try to shoot and destroy the objects using the spaceship 86. The gaming system enables player #2 to place a wager by displaying on display device 16, 18 message 84 of, "PLAYER #2, PLEASE ALLOCATE CREDITS TO PLAY AN INTERACTIVE OUTER SPACE TYPE SHOOTING GAME." It should be appreciated that in various embodiments, the gaming system does not display message 84 to player #1. The gaming system also displays on display device 16, 18 a display area 76 for player #2 that includes a wagering credits display 78, a wager component display 80, a credits won display 82, a points won display 85, and a competitive/non-competitive mode display 73. The wagering credits display 78 displays player #2's current number of credits, cash, account balance or the equivalent. The wager component display 80 displays an amount of a wager component automatically wagered by player #2 for each wagering event or competitive wagering event that occurs in the interactive game. The credits won displays 80 displays the number of credits player #2 has won and the points won display displays the number of points player #2 has won. It should be appreciated that in various embodiments, the gaming system does not display message 84 to player #1 and or display area 76 to player #1. The competitive/non-competitive mode display 73 indicates the mode in which player #2 is playing the interactive game (i.e., either competitive mode or non-competitive mode).

Figure 3D:
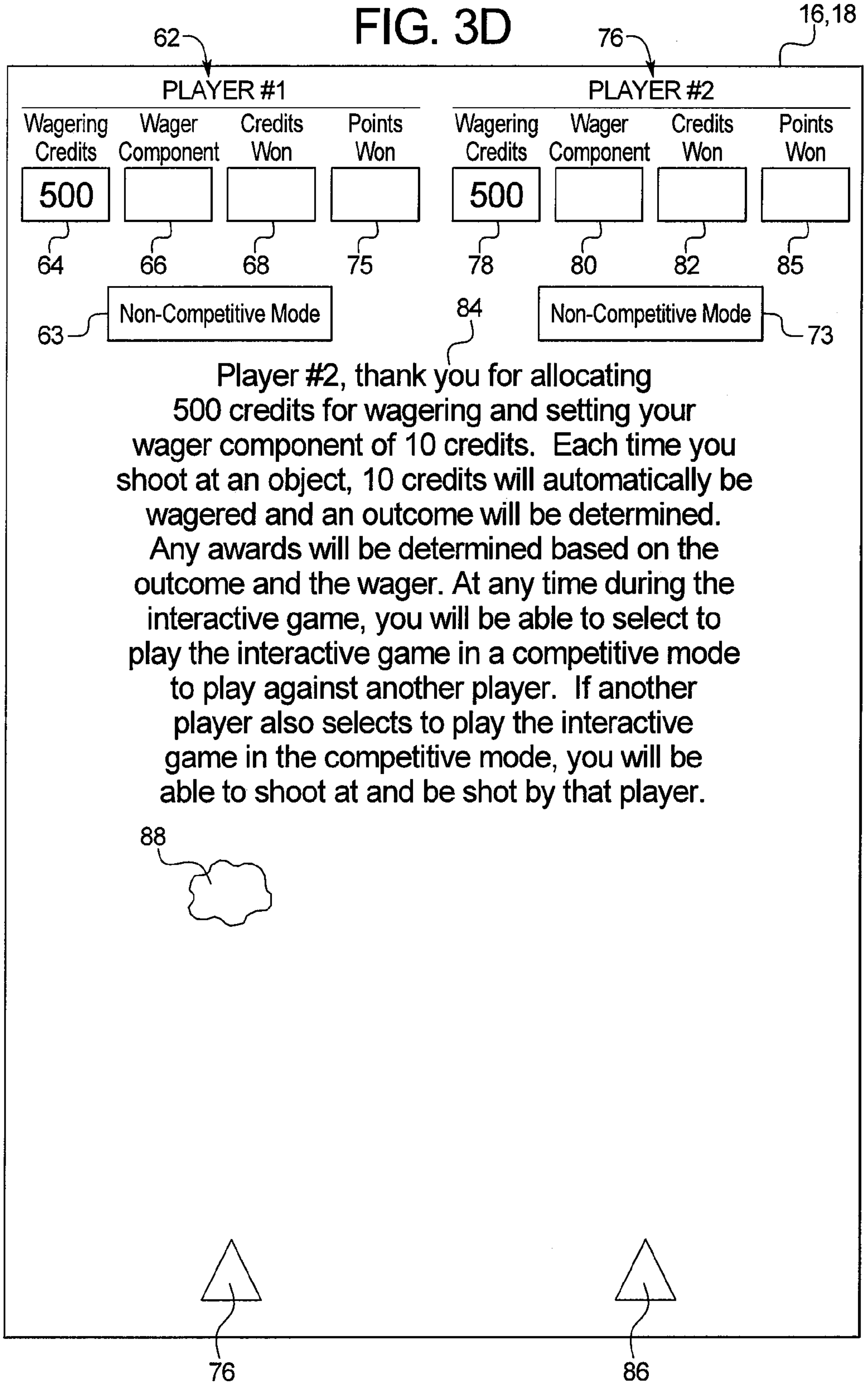

Player #2 also allocates 500 credits to the interactive game and selects a wager component of 10 credits for each wagering event in the interactive game, as illustrated by FIG. 3D. In this example embodiment, player #1 and player #2 each selected the same wager component it should be appreciated, however, that in different embodiments player #1 and player #2 select different wager components. In this example embodiment, each wagering event for player #2 occurs when player #2 shoots at an object in the interactive game, such as the asteroid 88. It should be appreciated, however, that in different embodiments each wagering event occurs when player #2 shoots and hits one of the plurality of different objects. In other words, if the player shoots at an object and misses the object, no wagering event occurs in these different embodiments. It should also be appreciated that in various other embodiments, each wagering event occurs when a player shoots and misses one of the objects. In other words, if a player shoots and hits the object, no wagering event occurs in these alternative embodiments. For each wagering event that occurs for player #2, the gaming system automatically causes the selected wager component of 10 credits for player #2 to be wagered on that wagering event. The gaming system displays a message 84 to player #2 of, "PLAYER #2, THANK YOU FOR ALLOCATING 500 CREDITS FOR WAGERING AND SETTING YOUR WAGER COMPONENT OF 10 CREDITS. EACH TIME YOU SHOOT AT AN OBJECT 10 CREDITS WILL AUTOMATICALLY BE WAGERED AND AN OUTCOME WILL BE DETERMINED. ANY AWARDS WILL BE DETERMINED BASED ON THE OUTCOME AND THE WAGER. AT ANY TIME DURING THE INTERACTIVE GAME, YOU WILL BE ABLE TO SELECT TO PLAY THE INTERACTIVE GAME IN A COMPETITIVE MODE TO PLAY AGAINST ANOTHER PLAYER. IF ANOTHER PLAYER ALSO SELECTS TO PLAY THE INTERACTIVE GAME IN THE COMPETITIVE MODE, YOU WILL BE ABLE TO SHOOT AT AND BE SHOT BY THAT OTHER PLAYER" as illustrated by FIG. 3D. It should be appreciated that in various embodiments the gaming system does not display message 84 to player #1. The gaming system also displays the current number of wagering credits of 500 for player #2 in the wagering credits display 78 and the player #2 controlled spaceship 86 in the lower portion of the display 16, 18.

Figure 3E:
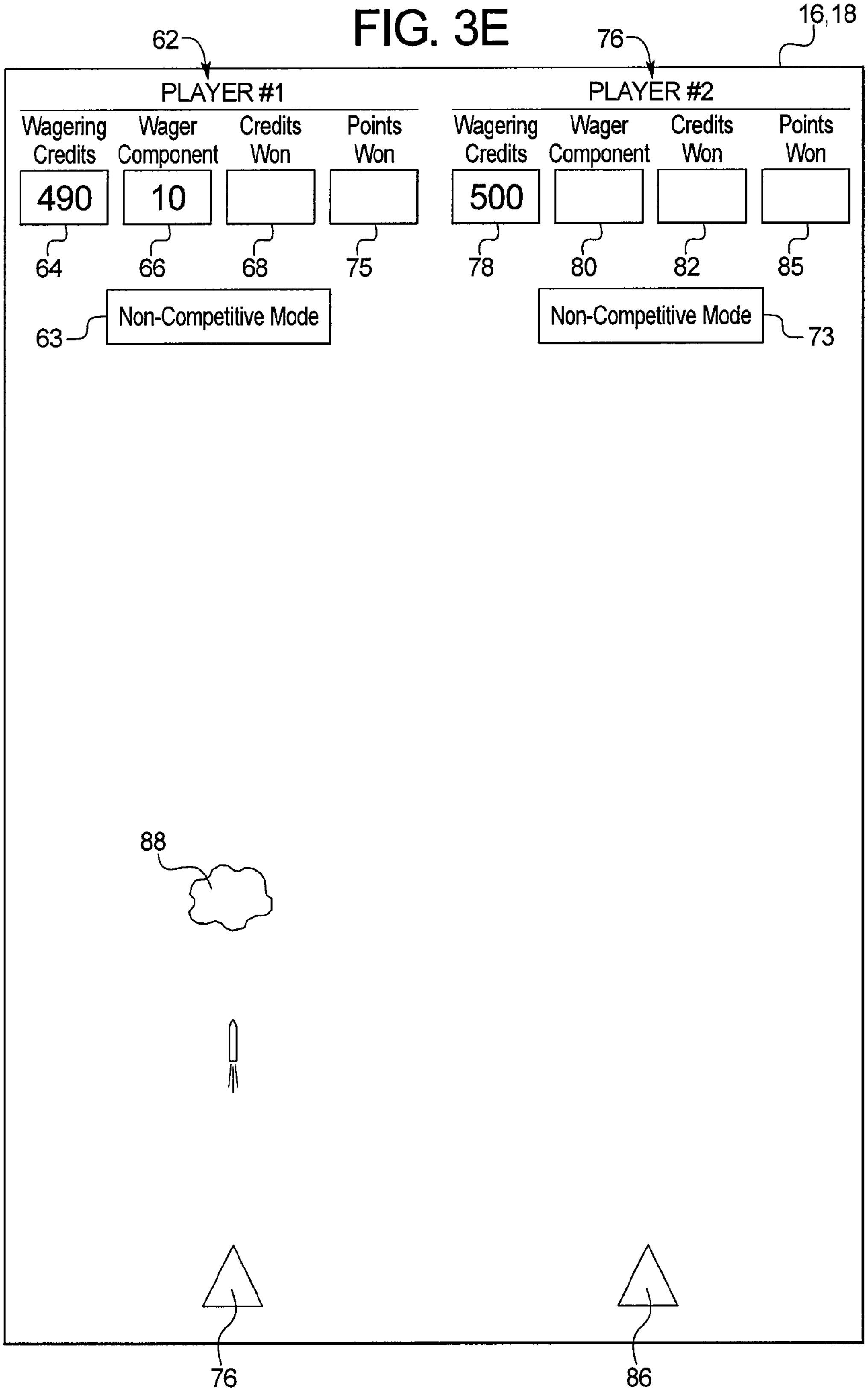
Figure 3F:
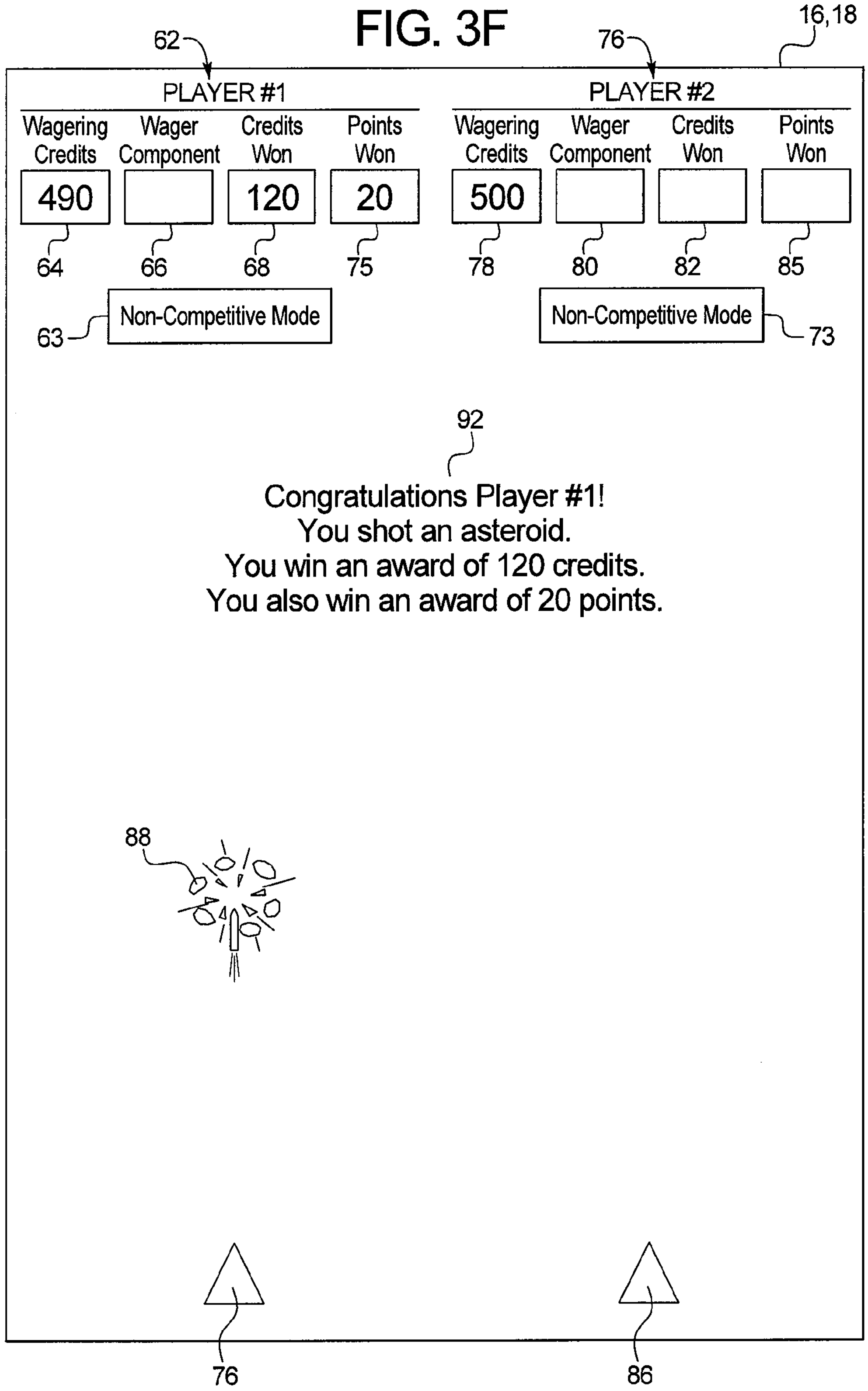

FIGS. 3E and 3F illustrate a first wagering event occurring for player #1 and the determination of an outcome for the first wagering event in the non-competitive mode of the interactive game. The first wagering event is player #1 shooting at the asteroid 88 as illustrated by FIG. 3E. The gaming system automatically causes a wager component of 10 credits to be wagered on the wagering event, as indicated by the display of 10 credits in the wager component display. The gaming system deducts 10 credits from the total number of current wagering credits of 500, as indicated by the display of 490 in the in the wagering credits display 64.

The gaming system determines an outcome for the wagering event, as illustrated by FIG. 3F. That is, the gaming system determines that player #1 destroyed the asteroid 88 as illustrated by the display of asteroid 88 exploding in FIG. 3F. The gaming system randomly determines an award of 120 credits based on the wager of 10 credits and provides the award of 120 credits as indicated by the 120 credits shown in the credits won display 68. The gaming system also determines an award of 20 points and provides the award of 20 points as indicated by the 20 points shown in the points won display 63. The gaming system also displays message 92 of, "CONGRATULATIONS PLAYER #1! YOU SHOT AN ASTEROID. YOU WIN AN AWARD OF 120 CREDITS. YOU ALSO WIN AN AWARD OF 20 POINTS." It should be appreciated that in various embodiments, the gaming system does not display message 92 to player #2.

Figure 3G:
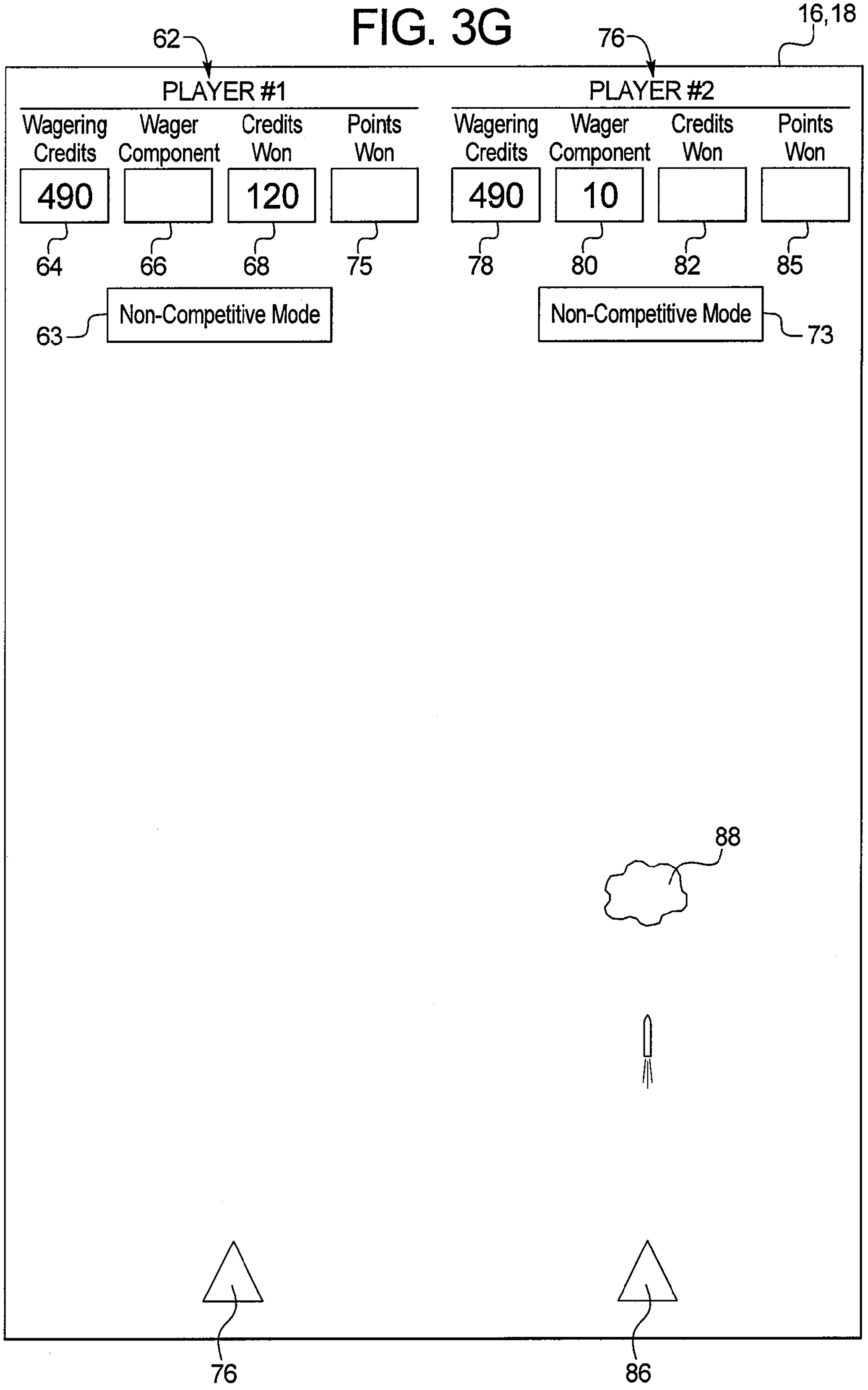
Figure 3H:

FIGS. 3G and 3H illustrates a first wagering event occurring for player #2 and the determination of an outcome for the first wagering event in the non-competitive mode of the interactive game. The first wagering event is player #2 shooting at asteroid 88 in the interactive game as illustrated by FIG. 3G. The gaming system automatically causes a wager component of 10 credits to be wagered on the wagering event, as indicated by the display of 10 credits in the wager component display. The gaming system deducts 10 credits from the total number of current wagering credits of 500, as indicated by the display of 490 wagering credits in the wagering credits display 64.

The gaming system determines an outcome for the wagering event, as illustrated by FIG. 3H. That is, the gaming system determines that player #2 destroyed the asteroid 88 as illustrated by the display of asteroid 88 exploding in FIG. 3F. The gaming system randomly determines an award of 120 credits based on the wager of 10 credits and displays the award of 120 credits in the credits won display 68. The gaming system also determines an award of 20 points and displays the award of 20 points in the points won display 75. The gaming system also displays a message 93 of, "CONGRATULATIONS PLAYER #2! YOU SHOT AN ASTEROID. YOU WIN AN AWARD OF 120 CREDITS. YOU ALSO WIN AN AWARD OF 20 CREDITS." It should be appreciated that in various embodiments, the gaming system does not display message 92 to player #1.

Figure 3I:
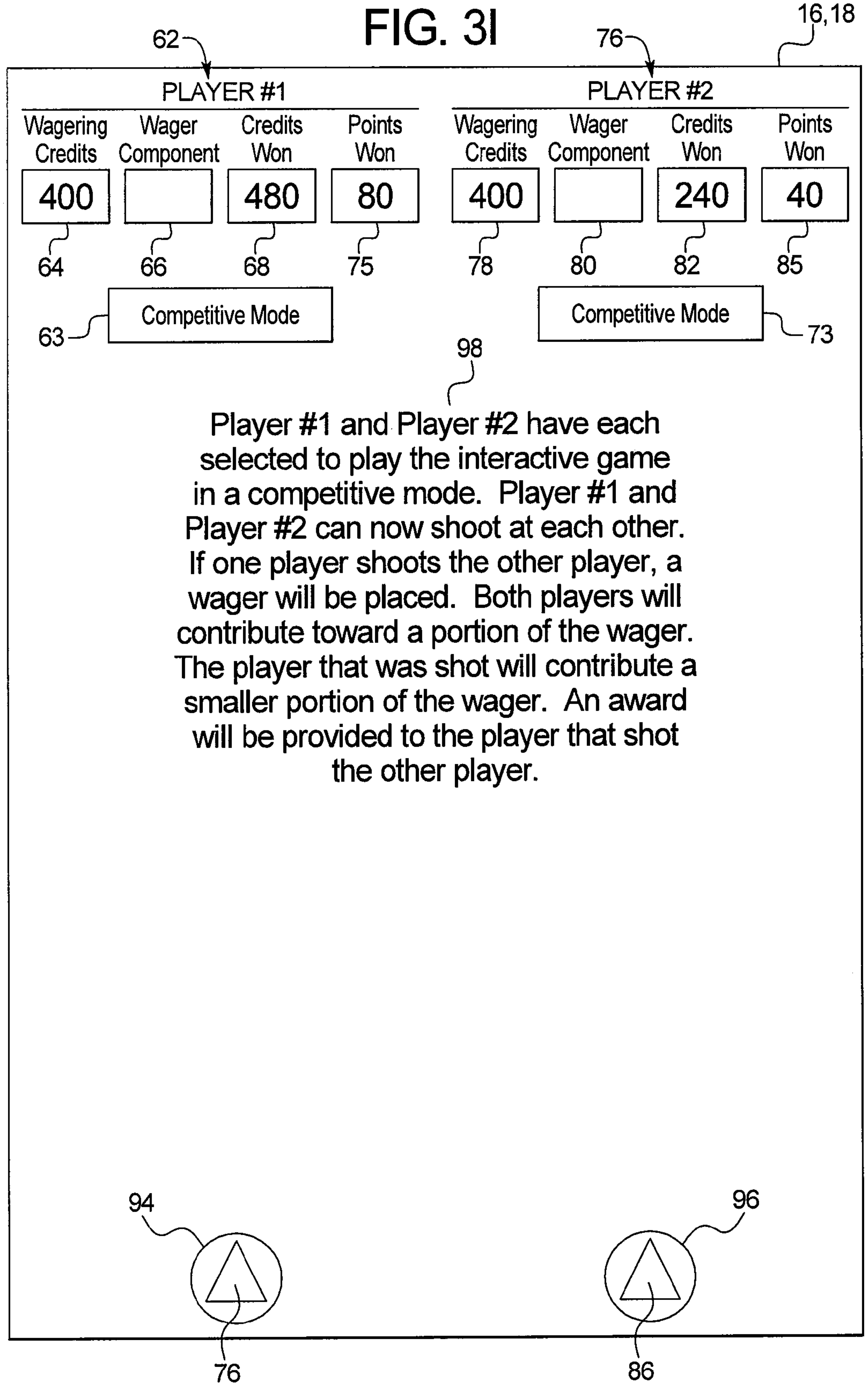

The gaming system displays the result of player #1 and player #2 each having selected to play the interactive game in the competitive mode at a point in time during the play of the interactive game in which player #1 and player #2 each have the same total number of wagering credits of 400, while player #1 has earned 480 credits and 80 points and player #2 has earned 240 credits and 40 points, as illustrated by FIG. 3I. The gaming system displays the interactive mode having been selected by player #1 and player #2 by encircling player #1's controlled spaceship 76 with ring 94 and encircling player #2's controlled spaceship 86 with ring 96. The gaming system also displays the interactive mode having been selected by changing the competitive/non-competitive mode display 63 and 73 to each show "COMPETITIVE MODE." In the competitive mode, a plurality of competitive wagering events can occur between player #1 and player #2. A competitive wagering event occurs when player #1 or player #2 shoots at and hits the other player's spaceship. The gaming system determines a winning outcome associated with one of player #1 or player #2 for each competitive wagering event. In other words, the gaming system determines a winning player and a losing player for each competitive wagering event. The winning player is the player that shot the other player and the losing player is the player that was shot. The gaming system displays message 96 of, "PLAYER #1 AND PLAYER #2 HAVE EACH SELECTED TO PLAY THE INTERACTIVE GAME IN A COMPETITIVE MODE. PLAYER #1 AND PLAYER #2 CAN NOW SHOOT AT EACH OTHER. IF ONE PLAYER SHOOTS THE OTHER PLAYER, A WAGER WILL BE PLACED. BOTH PLAYERS WILL CONTRIBUTE TOWARD A PORTION OF THE WAGER. THE PLAYER THAT WAS SHOT WILL CONTRIBUTE A SMALLER PORTION OF THE WAGER. AN AWARD WILL BE PROVIDED TO THE PLAYER THAT SHOT THE OTHER PLAYER." It should be appreciated that in various embodiments, the gaming system does not display message 96 at all.

Figure 3J:
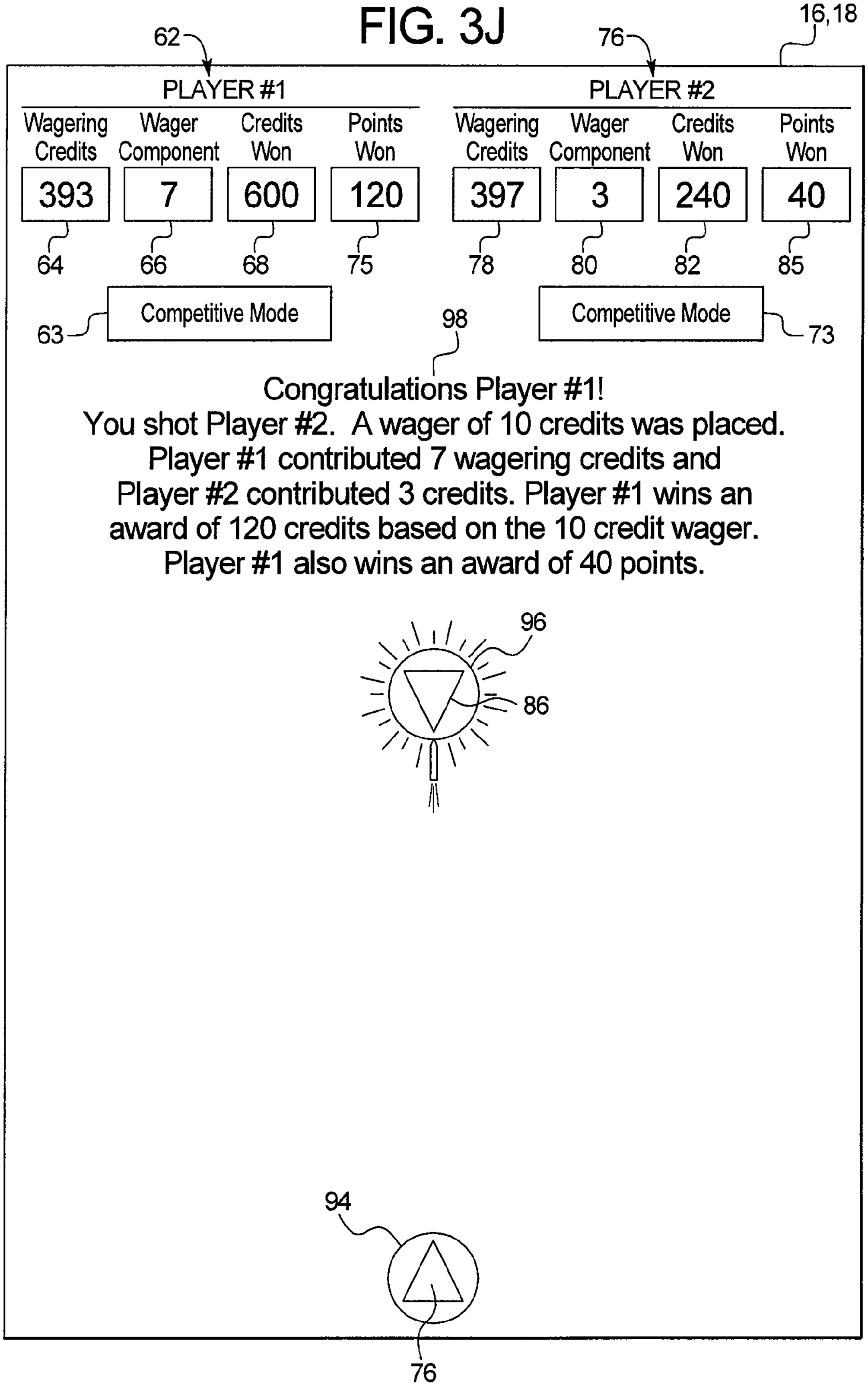

The gaming system displays a competitive wagering event having occurred between player #1 and player #2 during the play of the interactive game in the competitive mode, as illustrated by FIG. 3J. The gaming system determines a winning outcome associated with one player #1 and player #2 in the competition. The gaming system displays player #1 having shot player #2. Accordingly, the gaming system determines a winning outcome is associated with player #1 (i.e., player #1 is the winning player and player #2 is the losing player). The gaming system causes winning player #1 to contribute towards a portion of a wager for the competitive wagering event and player #2 to contribute towards a portion of a wager for the competitive wagering event. The portion winning player #1 contributes is 7 credits (i.e., a portion of player #1's wager component of 10 credits) as indicated by the display of 7 credits in player #1's wager component display 66. The portion losing player #2 contributes is 3 credits (i.e., a portion of player #2's wager component of 10 credits) as indicated by the display of 3 credits in player #2's wager component display 80. Thus, a total wager of 10 credits was placed for the competitive wagering event. The gaming system deducts 7 credits from the total wagering credits of 400 for winning player #1, as indicated by the display of 393 credits in player #1's wagering credits display 64 and deducts 3 credits from the total wagering credits of 100 for losing player #1, as indicated by the display of 397 credits in player #2's wagering credits display 78.

The gaming system randomly determines any award for the winning player based on the wager of 10 credits for the competitive wagering event. The award resulting from the wager of 10 credits is 120 credits. The gaming system adds 120 credits won to the 480 credits and displays the resulting total number of credits won of 600 in player #1's credits won display 68. The gaming system also determines an award of 40 points and display the resulting number of total points won to the player as indicated by the display of 120 points in the points won display 75. The gaming system also displays message 98 of, "CONGRATULATIONS PLAYER #1! YOU SHOT PLAYER #2. A WAGER OF 10 CREDITS WAS PLACED. PLAYER #1 CONTRIBUTED 7 WAGERING CREDITS AND PLAYER #2 CONTRIBUTED 3 WAGERING CREDITS. PLAYER #1 WINS AN AWARD OF 120 CREDITS BASED ON THE 10 CREDIT WAGER. PLAYER #1 ALSO WINS AN AWARD OF 40 POINTS." It should be appreciated that the outer space shooting game is one example game and that any suitable other game may be employed in accordance with the present disclosure as further discussed below.

It should be appreciated that in the above described embodiment that despite contributing a greater portion toward the wager for the competitive wagering event, the winning player may benefit by obtaining any award resulting from the wager, which includes a contribution made by the losing player. It should also be appreciated that the losing player may also benefit by making a smaller contribution toward the wager. Thus, the losing player, which may be a less skilled player, is able to play the interactive game for a longer period of time.

It should also be appreciated that in various embodiments the gaming system includes at least a first player of a first gaming device and a second player of a second gaming device. The gaming system enables the first player to play the interactive game in a non-competitive mode, which is operable upon a first wager. The first wager includes a first plurality of wager components. The gaming system also enables the first player to select to play the interactive game in a competitive mode. During the play of the interactive game in the non-competitive mode, the gaming system determines whether a wagering event occurs in association with the interactive game in the non-competitive mode. For each wagering event that occurs, the gaming system causes one of the first plurality of wager components to be wagered, determines an outcome for the wagering event, and randomly determines any awards to provide the first player resulting from the outcome and the wager component.

The gaming system enables the second player to play the interactive game in the non-competitive mode, which is operable upon a second wager. The second wager includes a second plurality of wager components. The gaming system also enables the second player to select to play the interactive game in the competitive mode. During the play of the interactive game in the non-competitive mode, the gaming system determines whether a wagering event occurs in association with the interactive game in the non-competitive mode. For each wagering event that occurs, the gaming system causes one of the second plurality of wager components to be wagered, determines an outcome for the wagering event, and randomly determines any award to provide the second player resulting from the outcome and the wager component.

If the first player and the second player select to play the interactive game in the competitive mode, the gaming system is configured to determine whether one of a plurality of competitive wagering events occurs in association with the interactive game in the competitive mode. The competitive wagering events include a competition between the first player and the second player.

For each competitive wagering event that occurs, the gaming system determines a winning outcome associated with one of the first player and the second player. If the determination is the winning outcome is associated with the first player, the gaming system determines a portion of one of the first plurality of wager components to be wagered by the first player, and causes that portion of the first plurality of wager components to be wagered. The gaming system determines a portion of one of the second plurality of wager components to be wagered by the second player and causes that portion of the second plurality of wager components to be wagered. The portion of one of the second plurality of wager components is less than the portion of the first plurality of wager components. The gaming system determines any award to provide the first player resulting from the determined winning outcome of the competitive wagering event and each of the portions of the wager components wagered by the first player and the second player.

in various embodiments described herein, the gaming system is configured to enable an operator or casino to change or affect the portion the winning player contributes toward the wager and the portion the losing player contributes toward the wager for each competitive wagering event. For example, instead of the winning player contributing 7 credits toward the wager as described in the above example embodiment, the operator configures the gaming system to cause the winning player to contribute 9 credits towards the wager for the competitive wagering event and the losing player to contribute 1 credit towards the wager for the competitive wagering event. Thus, it should be appreciated that by changing the portion the winning player and the losing player contributes towards the wager, the gaming system is configured to enable an operator to affect the competitive nature of each competitive wagering event.

Competitive Wagering Event Resulting in a Shared Award

In another embodiment, instead of determining winning player and losing player wager contributions based on the result of the competitive wagering event, the gaming system determines winning player and losing player award portions of any award determined to result from the wager for the competitive wagering event. Similar to the embodiment illustrated by FIGS. 3A to 3J, in this embodiment, when two players play an interactive game and also select to play the interactive game in the competitive mode, for a competitive wagering event, the gaming system determines a winning player of the competitive wagering event and a losing player of the competitive wagering event and determines any winning player award portion and any different losing player award portion. Thus, this embodiment differs from the embodiment illustrated by FIGS. 3A to 3J in that for each competitive wagering event, both the winning player and the losing player receive any determined award portion based on the result of the competitive wagering event and the wager for that competitive wagering event. That is, in this embodiment, for each competitive wagering event, the gaming system causes both the winning player and the losing player to contribute the same amount towards a wager associated with the competitive wagering event, and determines any winning player award portion and any different losing player award portion based on the wager. Any losing player award portion is less than any winning player award portion. The gaming system provides any winning player award portion to the winning player, and any losing player award portion to the losing player. It should be appreciated that in other embodiments, the gaming system causes the amount of the winning player wager contribution to be different from the amount of the losing player wager contribution.

Figure 4A:
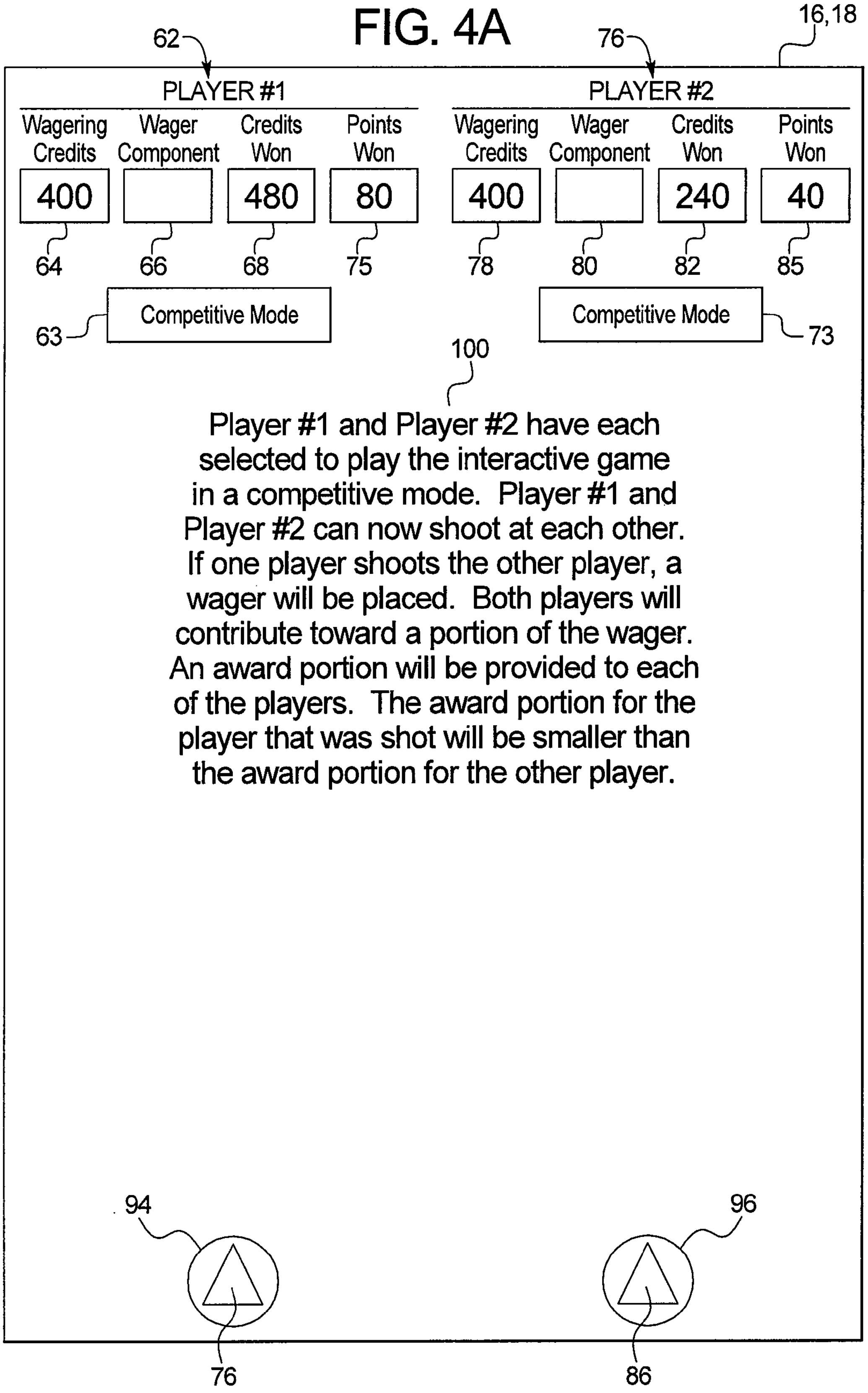
FIGS. 4A and 4B are front views of a gaming device display providing a play of an interactive game in accordance with an example of another embodiment of the gaming system disclosed herein.

More specifically, in FIG. 4A, the gaming system displays the result of player #1 and player #2 each having selected to play the interactive game in the competitive mode at a point in time during the play of the interactive game in which player #1 and player #2 each have the same total number of wagering credits of 400 and player #1 has earned 240 credits and 80 points, while player #2 has earned 120 credits and 40 points, as illustrated by FIG. 4A. The gaming system displays the interactive mode having been selected by player #1 and player #2 by encircling player #1's controlled spaceship 76 with ring 94 and encircling player #2's controlled spaceship 86 with ring 96. The gaming system also displays the interactive mode having been selected by player #1 and player #2 by changing the competitive/non-competitive mode displays 63 and 73 to each show "COMPETITIVE MODE." In the competitive mode, a plurality of competitive wagering events can occur between player #1 and player #2. A competitive wagering event occurs when one player shoots at and hits the other player's spaceship. The gaming system determines a winning outcome associated with one of player #1 and player #2 for each competitive wagering event (i.e., a winning player and a losing player). The winning player is the player that shot the other player and the losing player is the player that was shot by the other player. The gaming system displays message 100 of, "PLAYER #1 AND PLAYER #2 HAVE EACH SELECTED TO PLAY THE INTERACTIVE GAME IN THE COMPETITIVE MODE. PLAYER #1 AND PLAYER #2 CAN NOW SHOOT AT EACH OTHER. IF ONE PLAYER SHOOTS THE OTHER PLAYER, A WAGER WILL BE PLACED. BOTH PLAYERS WILL CONTRIBUTE TOWARD A PORTION OF THE WAGER. AN AWARD PORTION WILL BE PROVIDED TO EACH OF THE PLAYERS. THE AWARD PORTION FOR THE PLAYER THAT WAS SHOT WILL BE SMALLER THAN THE AWARD PORTION FOR THE OTHER PLAYER." It should be appreciated that in various embodiments, the gaming system does not display message 96 at all.

Figure 4B:
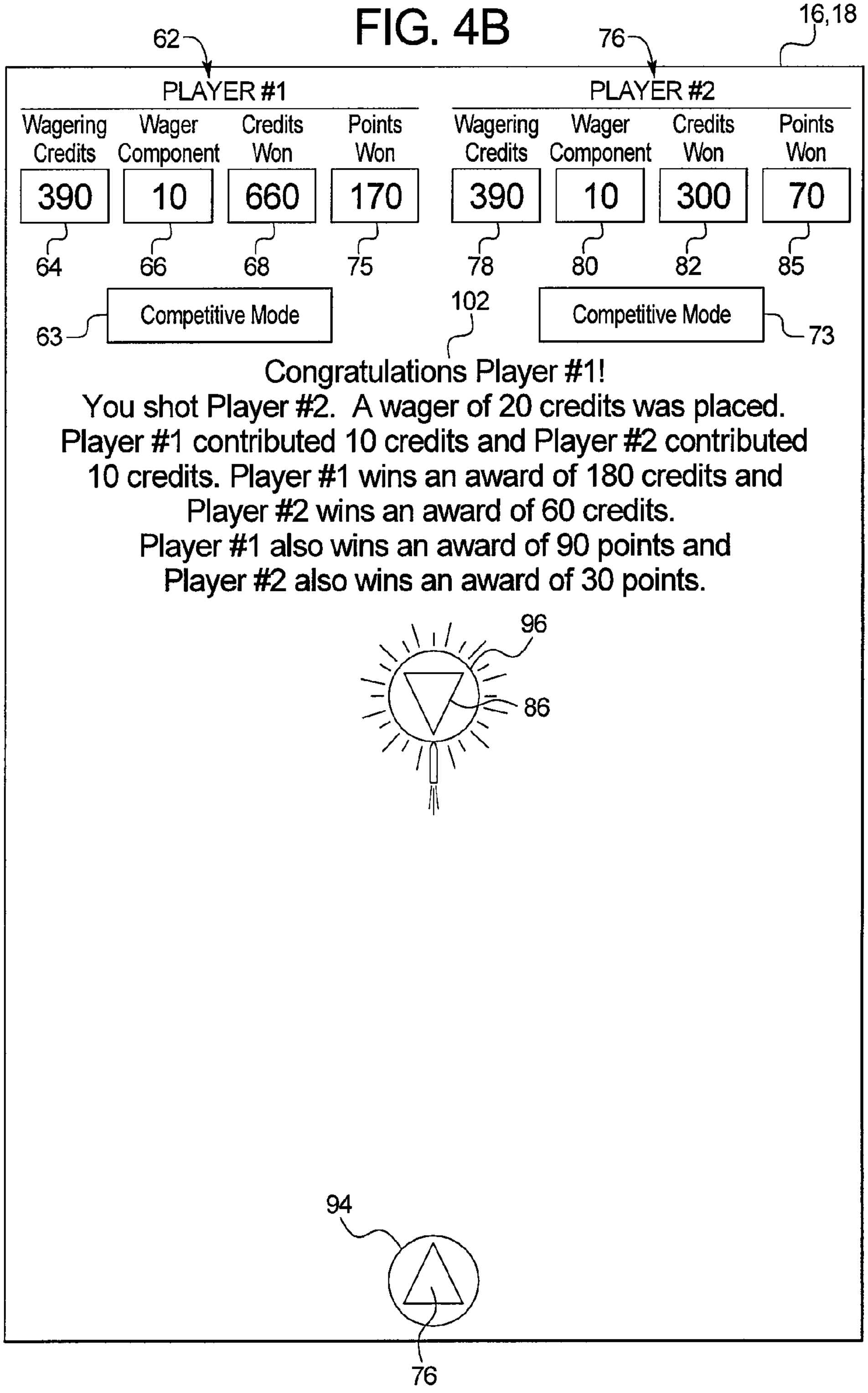

The gaming system displays the result of a competitive wagering event having occurred between player #1 and player #2 during the play of the interactive game in the competitive mode, as illustrated by FIG. 4B. The gaming system determines a winning outcome associated with one of player #1 and player #2 for the competitive wagering event. The gaming system displays player #1 having shot player #2. Accordingly, the gaming system determines a winning outcome is associated with player #1 (i.e., player #1 is the winning player and player #2 is the losing player). The gaming system causes player #1 and player #2 to each contribute 10 credits (i.e., one of the wager components for player #1 and one of the wager components for player #2) towards a total wager of 20 credits for the competitive wagering event, as indicated by the display of 10 credits in player #1's wager component display 66 and the display of 10 credits in player #2's wager component display 80. The gaming system deducts the 10 credits wagered from each of player #1 and player #2's total wagering credits, as indicated by the display of 390 credits in player #1's wagering credits display 64 and the display of 390 credits in player #2's wagering credits display 82. The gaming system randomly determines an award portion for winning player #1 of 180 credits and randomly determines an award portion of 60 credits for losing player #2, and displays 660 credits (480 credits plus 180 credits) in player #1's credits won display 68 and displays 300 credits (240 credits plus 60 credits) in player #2's credits won display 86. The gaming system also determines a points award portion for player #1 of 90 points and determines a points award portion for player #2 of 30 points and displays the total number of points won to each of player #1 and player #2 respectively as indicated by the points won display 75 and 85 respectively. The gaming system displays message 102 of, "CONGRATULATIONS PLAYER #1! YOU SHOT PLAYER #2. A WAGER OF 20 CREDITS WAS PLACED. PLAYER #1 CONTRIBUTED 10 CREDITS AND PLAYER #2 CONTRIBUTED 10 CREDITS. PLAYER #1 WINS AN AWARD OF 180 CREDITS AND PLAYER #2 WINS AN AWARD OF 60 CREDITS. PLAYER #1 ALSO WINS AN AWARD OF 90 POINTS AND PLAYER #2 ALSO WINS AN AWARD OF 30 POINTS."

It should be appreciated that while in the above described embodiment, the winning player award portion is equal to 75% of the total award (i.e., 180 of 240 credits) and the losing player award portion is equal to 25% of the total award (i.e., 60 of the 240 credits), in various other embodiments, the winning player award portion and losing player award portion may be different percentages of the total award. It should also be appreciated that while in the above described embodiment the winning player and the losing player each contribute the same amount toward the wager (i.e., 10 credits), in various other embodiments, the winning player and the losing player each contribute different amounts toward the wager.

It should also be appreciated from the above described embodiments, that despite winning only a portion of an award for the competitive wagering event, the winning player may benefit by obtaining an award portion resulting from a wager that includes a contribution made by the losing player. The losing player may also benefit by winning any portion of the award resulting from the wager. Thus, the losing player, which may be a less skilled player, is more likely to want to play the interactive game for a longer period of time.

It should also be appreciated that in various embodiments the gaming system includes at least a first player of a first gaming device and a second player of a second gaming device. The gaming system enables the first player to play an interactive game in a non-competitive mode, which is operable upon a first wager. The first wager includes a first plurality of wager components. The gaming system also enables the first player to select to play the interactive game in a competitive mode. During the play of the interactive game in the non-competitive mode, the gaming system determines whether a wagering event occurs in association with the interactive game. For each wagering event that occurs, the gaming system causes one of the first plurality of wager components to be wagered, determines an outcome for the wagering event, and determines any awards to provide the first player resulting from the outcome and the wager component.

The gaming system enables the second player to play the interactive game, which is operable upon a second wager. The second wager includes a second plurality of wager components. The gaming system also enables the second player to select to play the interactive game in a competitive mode, determines whether a wagering event occurs in association with the interactive game. For each wagering event that occurs, the gaming system causes one of the second plurality of wager components to be wagered on the interactive game, determines an outcome for the wagering event, and determines any award to provide the second player resulting from the outcome and the wager component.

If the first player and the second player select to play the interactive game in the competitive mode, the controller and the first and second gaming devices are configured to, determine whether one of a plurality of competitive wagering events occurs in association with the interactive game. The competitive wagering events include a competition between the first player and the second player.

For each competitive wagering event that occurs, the gaming system causes one of the first plurality of wager components to be wagered by the first player, causes one of the second plurality of wager components to be wagered by the second player, and determines a winning outcome associated with one of the first player and the second player. For the player associated with the winning outcome, the gaming system determines an award portion for that player resulting from the determined winning outcome of the competitive wagering event and each of the wager components wagered by the first player and the second player. For the player not associated with the winning outcome, the gaming system determines an award portion for that player resulting form the determined winning outcome for the competitive wagering event and each of the wager components wagered by the first player and the second player. The award portion for the player associated with the winning outcome is greater than the award portion for the player not associated with the winning outcome.

Competitive Wagering Event Resulting in Communal Award Probability Determination In another embodiment, instead of the gaming system determining wagers for the winning player and losing player, or any award portion for the winning player and losing player based on the result of the competitive wagering event, the gaming system determines part of a losing player award probability that will be transferred to a winning player award probability based on the result of the competitive wagering event. In one embodiment, the gaming system determines each player's award probability based on the initial wager amount placed by that player to play the interactive game. Similar to the embodiment illustrated by FIGS. 3A to 3J and by FIGS. 4A and 4B, in this embodiment, when two players select to play the interactive game in the competitive mode, the gaming system matches those two players, and for each competitive wagering event, determines a winning player of the competitive wagering event and a losing player of the competitive wagering event. For each competitive wagering event that occurs in the competitive mode, the gaming system causes part of the losing player award probability to be transferred to the winning player award probability. In one embodiment, the gaming system randomly determines the part of the losing player award probability (e.g., an amount of the losing player award probability) that will be transferred to the winning player award probability. At some point during the play of the interactive game, an award generating triggering event occurs. Upon the occurrence of the award generating triggering event, the gaming system randomly selects one of the players of the interactive game to receive the communal award. The player with a larger communal award probability has a greater likelihood of being selected as the player to receive the communal award.

In various example embodiments including a communal award, for each player playing the interactive game in the non-competitive mode, the gaming system includes a plurality of wagering events. For each wagering event that occurs for each player, the gaming system causes a wager to placed by the player for that wagering event, determines an outcome for the wagering event, and randomly determines any awards to provide the player based on the outcome and the wager.

Figure 5A:
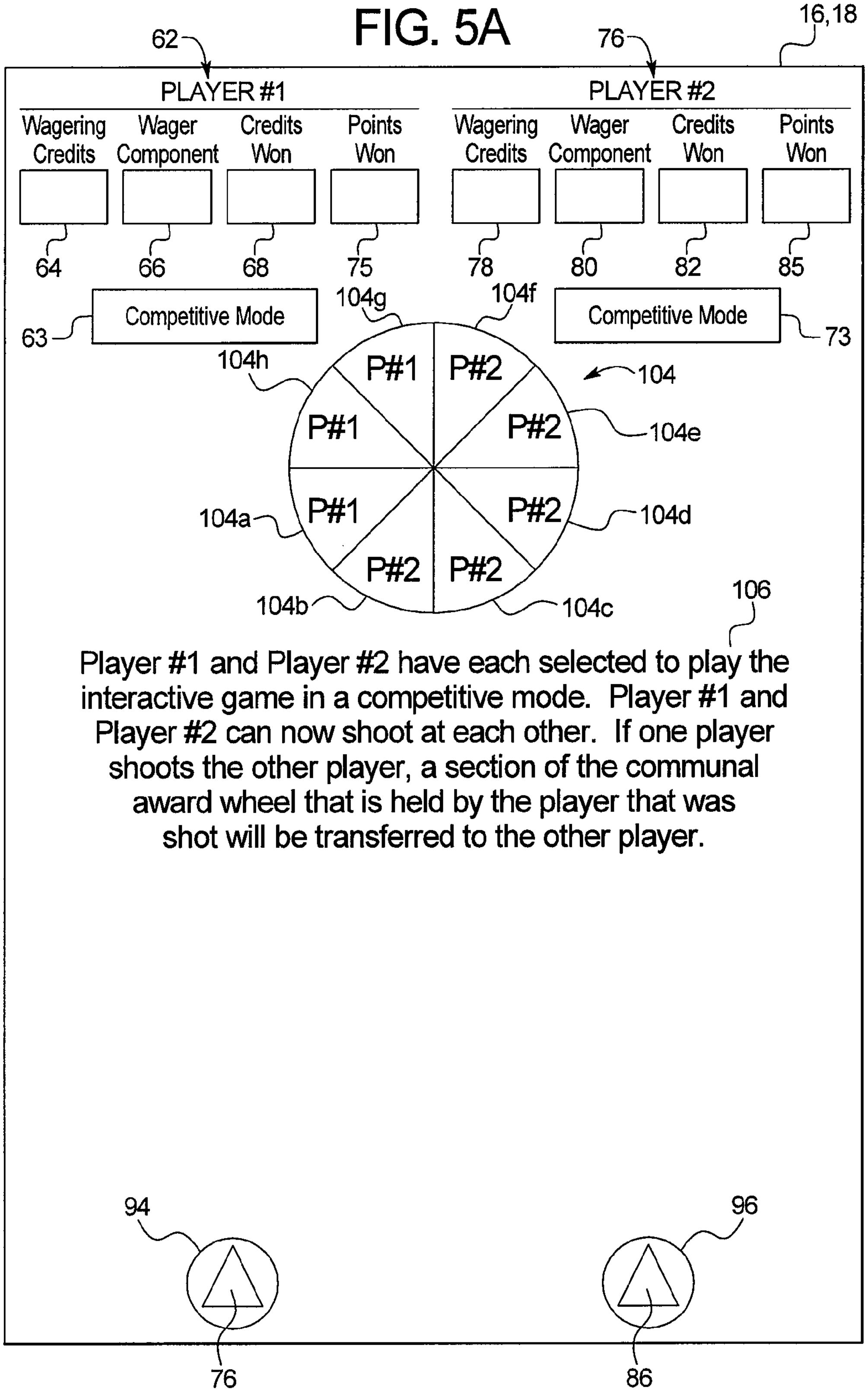
FIGS. 5A, 5B, 5C, 5D and 5E are front views of a gaming device display providing a play of an interactive game in accordance with an example of another embodiment of the gaming system disclosed herein.
Figure 5B:
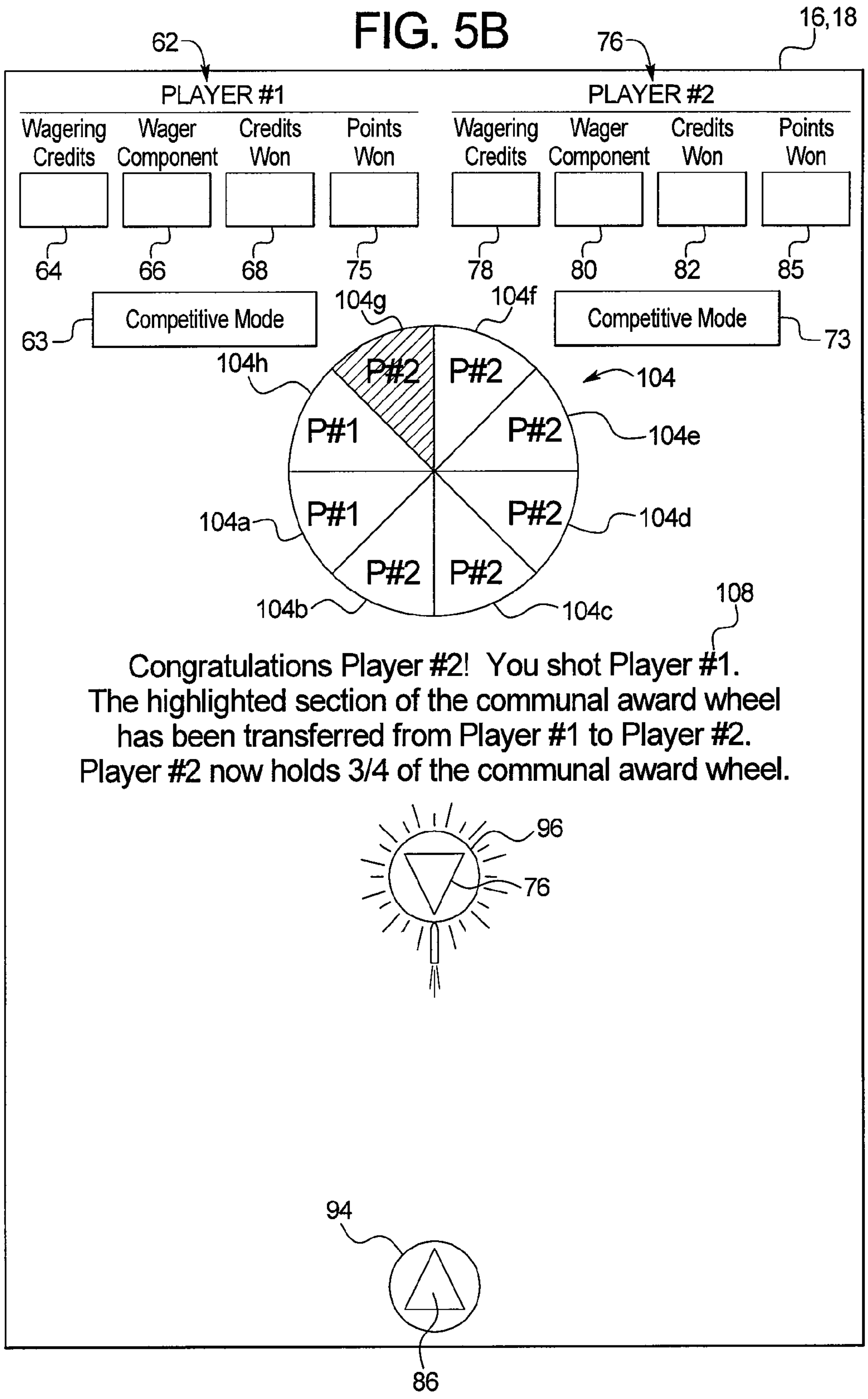
Figure 5C:
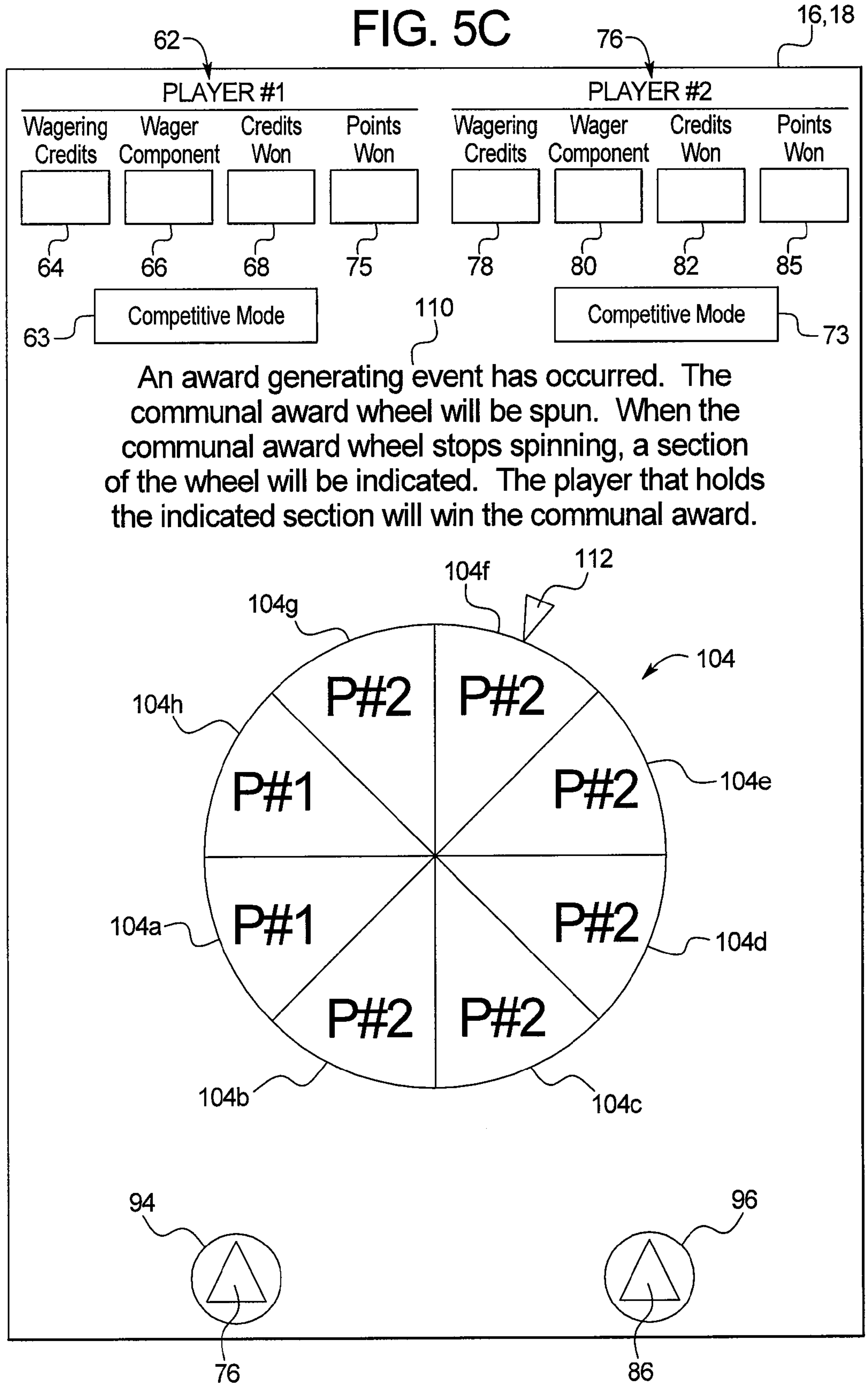

FIGS. 5A, 5B and 5C illustrate one example embodiment in which two players have selected to play the interactive game in the competitive mode and the gaming system maintains a communal award and determines part of a player award probability that will be transferred from the losing player to the winning player resulting from a competitive wagering event. In this illustrated embodiment, the gaming system displays the communal award to each of the players as a communal award wheel 104, as illustrated by FIG. 5A. The communal award wheel 104 is divided into eight equal sections 104*a*, 104*b*, 104*c*, 104*d*, 104*e*, 104*f*, 104*g* and 104*h*. Each section 104*a* to 104*h* of the communal award wheel 104 represents a part of the total communal award. The gaming system determines a probability of winning the communal award for each player (i.e., the amount of the communal award held or earned by each player or each player's award probability). That is, the gaming system determines that player #2 holds, or has earned 5/8ths of the communal wheel (i.e., five sections 104$f$, 104$e$, 104$d$, 104$c$ and 104$b$) and player #1 holds, or has earned 3/8ths of the communal award wheel (i.e., three sections 104$g$, 104$h$ and 104$a$), as illustrated by FIG. 5A. Thus, the probability that player #1 will be selected as the player to receive the communal award is 5/8ths or 62.5% and the probability that player #2 will be selected as the player to received the communal award is 3/8ths or 37.5%. In one embodiment, the gaming system determines the probability of receiving the communal award for each player based on the initial wager amount placed by that player to play the interactive game. The gaming system displays message 106 of, "PLAYER #1 and PLAYER #2 HAVE EACH SELECTED TO PLAY THE INTERACTIVE GAME IN THE COMPETITIVE MODE. PLAYER #1 AND PLAYER #2 CAN NOW SHOOT AT EACH OTHER. IF ONE PLAYER SHOOTS THE OTHER PLAYER, A SECTION OF THE COMMUNAL AWARD WHEEL THAT IS HELD BY THE PLAYER THAT WAS SHOT WILL BE TRANSFERRED TO THE OTHER PLAYER." It should be appreciated that in various embodiments, the gaming system does not display message 106 at all.

The gaming system displays a competitive wagering event that has occurred between player #1 and player #2, as illustrated by FIG. 5B. That is, the gaming system determines a winning outcome associated with one of player #1 and player #2 for the competitive wagering event. The gaming system displays player #1 having shot player #2, as illustrated by FIG. 5B. Accordingly, the gaming system determined a winning outcome is associated with player #1 (i.e., player #1 is the winning player and player #2 is the losing player). The gaming system caused part of the losing player probability of the communal award to be transferred to the winning player probability of the communal award, as illustrated by section 104$g$ of the communal award wheel being highlighted, which indicates that player #2 now holds that section of the communal award. Because of this transfer, player #1 holds 2 of the 8 sections of the wheel (i.e., an award probability equal to 2/8th's of the communal award) and player #2 holds 6 of the 8 sections of the wheel (i.e., an award probability equal to 3/4th's of the communal award). The gaming system displays message 108 of, "CONGRATULATIONS PLAYER #2! YOU SHOT PLAYER #1. THE HIGHLIGHTED SECTION OF THE COMMUNAL AWARD WHEEL HAS BEEN TRANSFERRED FROM PLAYER #1 TO PLAYER #2. PLAYER #2 NOW HOLDS 3/4THS OF THE COMMUNAL AWARD WHEEL."

Figure 5D:
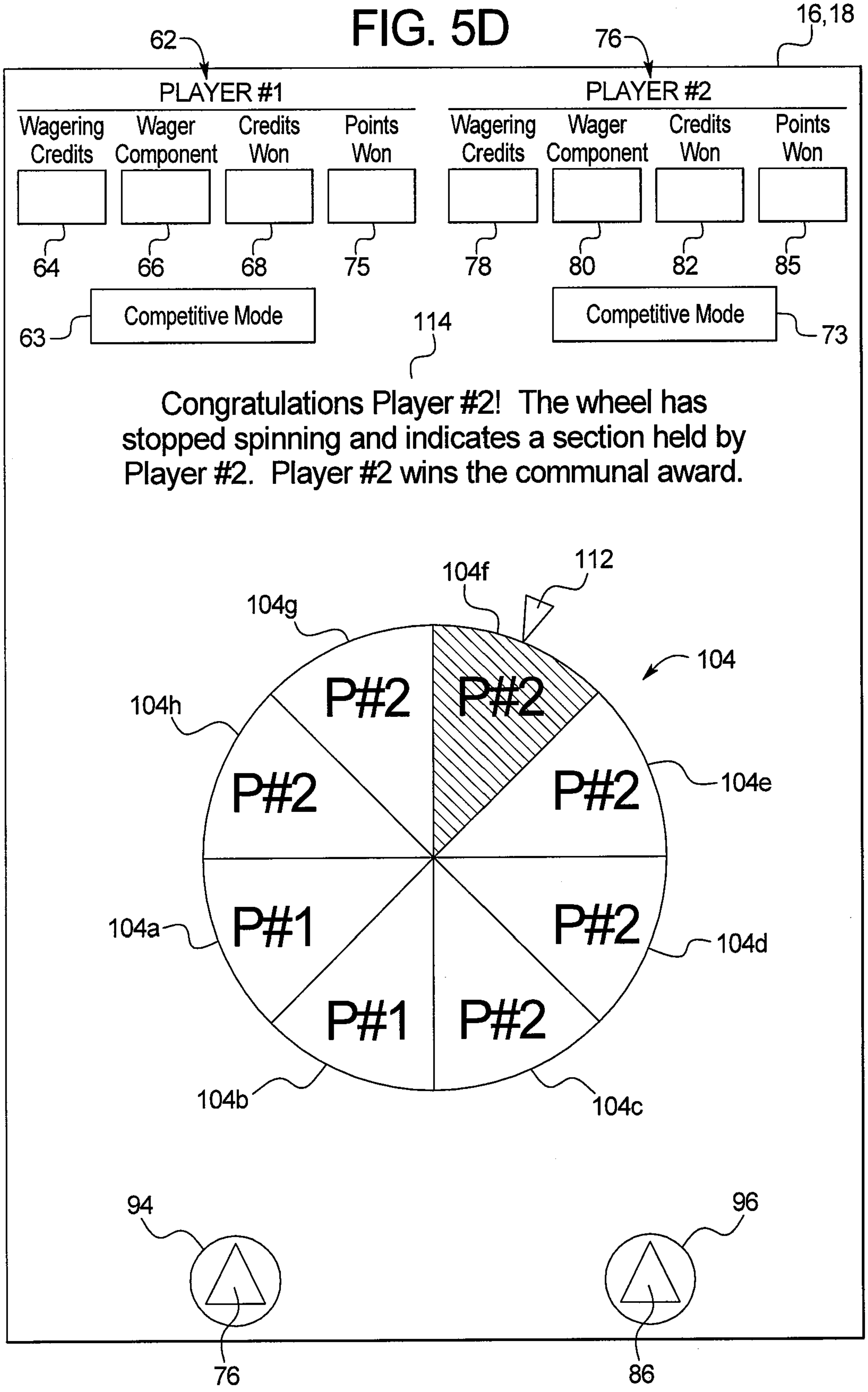

The gaming system selects one of the players to receive the communal award upon the occurrence of an award generating triggering event, as illustrated by FIGS. 5C and 5D. The gaming system first displays that an award generating event has occurred and displays message 110 of, "AN AWARD GENERATING EVENT HAS OCCURRED. THE COMMUNAL AWARD WHEEL WILL BE SPUN. WHEN THE COMMUNAL AWARD WHEEL STOPS SPINNING A SECTION OF THE WHEEL WILL BE INDICATED. THE PLAYER THAT HOLDS THE INDICATED SECTION OF THE WHEEL WILL WIN THE COMMUNAL AWARD."

The gaming system displays the communal award wheel having been spun and indicating section 104$e$ of the wheel via indicator 112, as illustrated by FIG. 5D. Player #2 owns section 104$e$, as indicated by P#2 in section 104$e$. The gaming system accordingly selected player #2 to receive the communal award. The gaming system displays message 114 of, "CONGRATULATIONS PLAYER #2. THE WHEEL STOPPED SPINNING AND INDICATES A SECTION HELD BY PLAYER #2. PLAYER #2 WINS THE COMMUNAL AWARD." It should be appreciated that because player #2 holds 3/4ths of the communal award wheel, the probability that the indicator 110 would indicate a section of the wheel held by player #2 is greater than the probability that the indicator would indicate a section of the wheel held by player #1. Thus, the probability that player #2 would be selected to receive the communal award was greater than the probability that player #1 would be selected to receive the communal award.

Figure 5E:
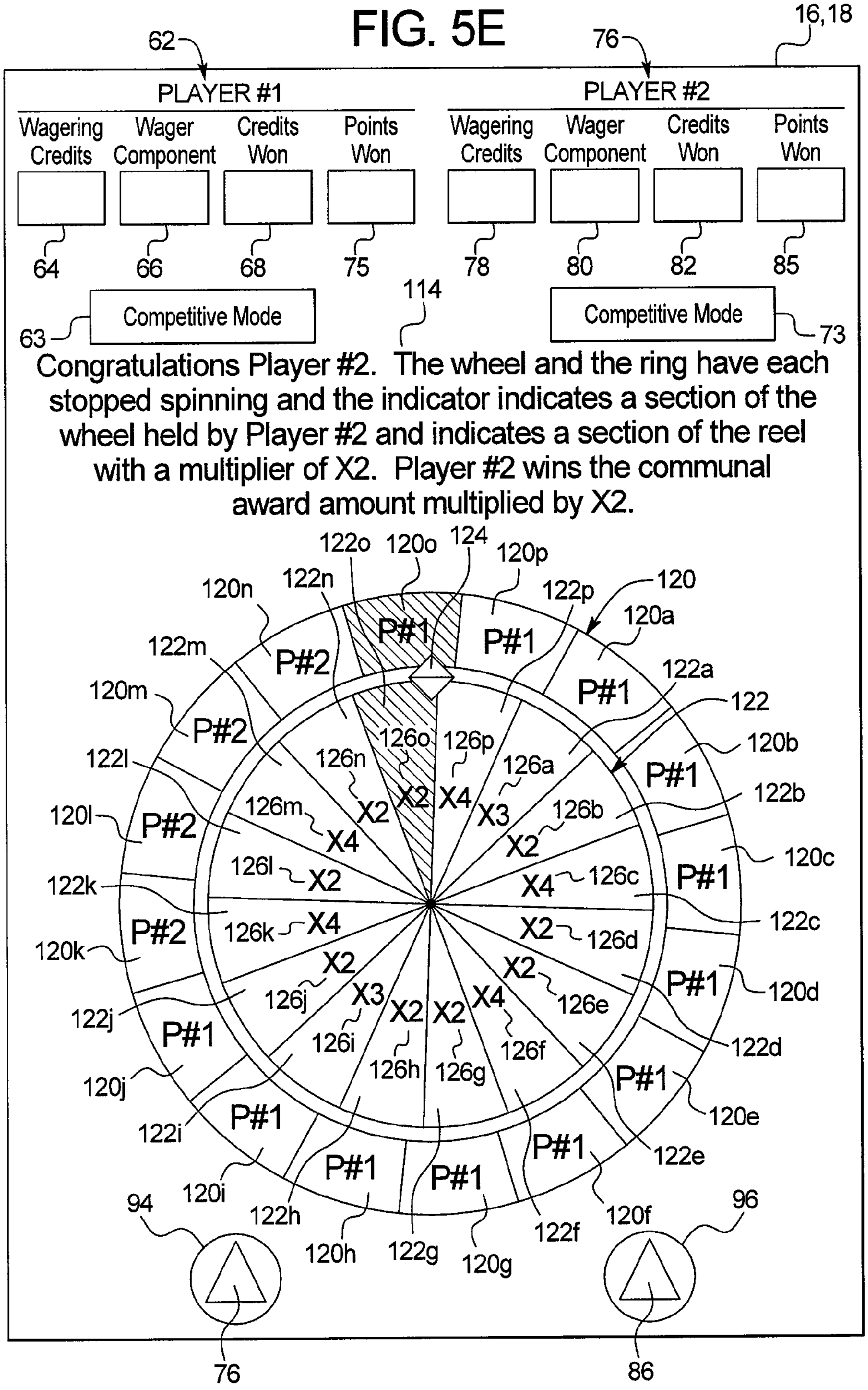

In another example embodiment in which the gaming system includes a communal award and displays the communal award to the players as a communal award wheel, instead of the gaming system displaying a single communal award wheel, the gaming system displays two wheels, or a ring 120 which surrounds a wheel 122, as illustrated by FIG. 5E. Similar to the wheel 104 described above with respect to the example embodiment of FIGS. 5A to 5D, in this example embodiment, ring 120 is divided into equal sections 120$a$, 120$b$, 120$c$, 120$d$, 120$e$, 120$f$, 120$g$, 120$h$, 120$i$, 120$j$, 120$k$, 120$l$, 120$m$, 120$n$, 120$o$, and 120$p$. Each section 120$a$ to 120$p$ of the wheel 120 represents a part of the total communal award. The wheel 122 is also divided into sections 122$a$, 122$b$, 122$c$, 122$d$, 122$e$, 122$f$, 122$g$, 122$h$, 122$i$, 122$j$, 122$k$, 122$l$, 122$m$, 122$n$, 122$o$, and 122$p$. Each section of wheel displays multipliers 126$a$, 126$b$, 126$c$, 126$d$, 126$e$, 126$f$, 126$g$, 126$h$, 126$i$, 126$j$, 126$k$, 126$l$, 126$m$, 126$n$, 126$o$, and 126$p$ in sections 122$a$ to 112$p$ of the wheel 122 respectively.

Similar to the example embodiment of FIGS. 5A to 5D, the gaming system in this example embodiment determines a probability of winning the communal award for each player (i.e., the amount of the communal award held or earned by each player or each player's award probability). That is, the gaming system determines that player #1 holds, or has earned 3/4ths of the communal wheel (i.e., twelve sections 120$a$, 120$b$, 120$c$, 120$d$, 120$e$, 120$f$, 120$g$, 120$h$, 120$i$, 120$j$, 120$k$ and 120$l$) and player #2 holds, or has earned 1/4th of the communal award wheel (i.e., four sections 120$m$, 120$n$, 120$o$ and 120$p$), as illustrated by FIG. 5E. Thus, the probability that player #1 will be selected as the player to receive the communal award is 3/4ths or 75% and the probability that player #2 will be selected as the player to receive the communal award is 1/4th or 25%. In one embodiment, the gaming system determines the probability of receiving the communal award for each player based on the initial wager amount placed by that player to play the interactive game.

Upon an occurrence of an award generating triggering event, the gaming system causes the wheel 120 to spin in one direction and the ring 122 to spin in an opposite direction. The gaming system also causes both the ring 120 and the wheel 122 to stop spinning indicating one of the sections of the ring 120 and one of the sections of the wheel 122 via indicator 126, as illustrated by FIG. 5E. The player that holds or has earned the indicated section of the ring 120 is the player that the gaming system selects to receive the communal award. The communal award is multiplied by the multiplier of the indicated section of the wheel 122. In the embodiment illustrated by FIG. 5E, the gaming system caused the wheel 122 and the ring 120 to stop spinning indicating section 120$o$ of the ring 120 (which includes multiplier ×2) and indicating section 122$o$ of the wheel 122 (which is held by player #1), as illustrated by FIG. 5E. Accordingly, the gaming system provided the communal award to player #1 and multiplied the communal award by ×2. The gaming system displays message 128 of, "CONGRATULATIONS PLAYER #1. THE WHEEL AND THE RING HAVE EACH STOPPED SPINNING AND THE INDICATOR INDICATES A SECTION OF THE WHEEL HELD BY PLAYER #1 AND INDICATES A SECTION OF THE RING WITH A MULTIPLIER OF ×2. PLAYER #1 WINS THE COMMUNAL AWARD AMOUNT MULTIPLIED BY ×2."

In another example embodiment in which the communal award is displayed as a wheel and a ring, instead of the gaming system displaying multipliers in each section of the wheel, the gaming system displays values in each section of the wheel. When the gaming system causes the wheel and the ring to stop spinning, the gaming system indicates one of the sections of the wheel and one of the sections of the reel. Instead of multiplying the communal award by the indicated multiplier and providing the resulting award to the player that holds the indicated section of the wheel, in this embodiment, the gaming system provides the value of the indicated section of the wheel to the player that holds the indicated section of the reel.

It should be appreciated that in various embodiments in which the communal award is displayed as a wheel and a ring, instead of the gaming system causing the wheel and the ring to spin in the opposite direction, the gaming system causes the wheel and the ring to spin in the same direction. It should also be appreciated that in various embodiments, the gaming system causes the wheel and the ring to spin at the same speed or at different speeds, and to stop at the same time or at different times. It should be appreciated that in various other embodiments, instead of the gaming system enabling the player to earn or hold sections of the wheel and display values or multipliers on the reel, the gaming system enables the player to earn or hold sections of the reel and display values or multipliers on the wheel.

In another example embodiment in which the gaming system includes a communal award and the result of the competitive wagering event causes part of the losing player award probability to be transferred to the winning player award probability, instead of the result of the competitive wagering event causing a transfer of part of a communal award wheel to another player, the result of the competitive wagering event causes the transfer of an area or territory of galaxy map. In this embodiment, instead of the gaming system displaying a communal award wheel, the gaming system displays a communal award galaxy map divided into territories, areas or sections. Similar to the embodiment described above in which each area on the communal award wheel represents a part of the total communal award, in this embodiment, each territory or area on the galaxy map represents a part of the total communal award. Also similar to the embodiment described above including a communal award wheel, the gaming system in this embodiment, determines a probability of winning the communal award for each player (i.e., the amount of the communal award held by each player, or each player's award probability). That is, for each player, the gaming system assigns one or more territories or sections of the map to that player. In one embodiment, each player's award probability is equal to the number of territories that player has been assigned divided by the total number of territories on the galaxy map. In one embodiment, the gaming system determines each player's award probability (i.e., the number of territories that player holds) based on the initial wager amount placed by that player to play the interactive game. In other embodiments, the gaming system determines each player's award probability based on that player reaching a predetermined wagering threshold.

More specifically, in one such example embodiment, for each competitive wagering event, the gaming system determines a winning player and a losing player of the competitive wagering event, and causes a transfer of part of the losing player award probability to the winning player award probability. That is, the gaming system causes a section or territory of the galaxy map held or earned by the losing player to be transferred to the winning player. Upon the occurrence of an award generating triggering event, the gaming system selects one of the players to receive the communal award. The probability of being selected as the player to receive the communal award is based on the number of sections on the map a player has been assigned or has earned (i.e., the player's award probability).

In another such example embodiment in which the gaming system displays a communal award galaxy map, the gaming system randomly generates and displays an asset, such as a flag or other suitable object, in at least one of the sections or territories of the galaxy map. The player that holds or has earned the territory in which the flag is displayed is able to capture that flag. In one such example embodiment, a player is able to capture the flag by causing their spaceship to collide with the flag. In another example embodiment, if one of the players captures or obtains a flag, that player obtains the communal award. In various other embodiments, a flag is randomly generated in a territory of the galaxy map and displayed only for a designated period of time. If a randomly chosen player does not capture the flag in the designated period of time, the gaming system removes the flag. When the flag is removed, the randomly chosen player no longer has the opportunity to win the communal award by capturing that flag, unless the gaming system randomly chooses that player again.

In various embodiments, the gaming system displays territories of the galaxy map having different sizes. In various embodiments, the size of a territory on the map represents a size or portion of the communal award. In various other embodiments, the greater the size of a territory on the map, the greater the likelihood that the gaming system will generate and display a flag in that territory. Hence, some territories will have a greater intrinsic value than others, making them more valuable to own or defend.

In various other embodiments, the gaming system enables players of the interactive game to compete as teams. In one such embodiment, the gaming system enables the players of the interactive game to agree whether to utilize teamwork. In other embodiments, the gaming system automatically groups players into various teams. In one embodiment, each player of a team can share a communal award anytime one of the players of that team collects an asset associated with a territory (such as the flag). In one embodiment, the gaming system enables a player of one team to block a player of another team's attempt to capture a flag associated with a territory of the galaxy map in the hope that the communal award and that area or territory of the communal award remains in play. In one such embodiment, the gaming system enables a player of one team to block a player of another team's attempt to capture a flag by shooting at the other player. In various embodiments, if a player shoots a player of their own team, the gaming system allocates or adds a determined number of credits to the communal award for shooting the player of their own team.

It should be appreciated that in various embodiments, the gaming system includes a first player of a first gaming device and second player of a second gaming device. The gaming system determines the first player award probability of a communal award and the second player award probability of the communal award. For each competitive wagering events that occurs, the gaming system determines a winning outcome associated with one of the first player and the second player for the competitive wagering event. If the first player is associated with the winning outcome, the gaming system causes a transfer of part of the second player award probability to the first player award probability. Upon the occurrence of an award generating triggering event, the gaming system selects one of the plurality of players to receive the communal award, and provides the communal award to the selected player. The probability of being the selected player to receive the communal award is based on that player's award probability.

In one embodiment, as discussed above, the gaming system allocates a portion of each wager placed by each player to play the interactive game to the communal award. Thus, the communal award grows in value as more players place a wager to play the interactive game. In various embodiments, the communal award is funded, at least in part, via the wagers or portion of the wagers placed by each player for each wagering event or competitive wagering event (e.g., wager components or portions of the wager components) during the play of the interactive game. It should be appreciated that the gaming system can allocate the same or different portions of any wager placed to the communal ward. In various other embodiments, the communal award is funded at least in part by a separate marketing budget.

In one embodiment, the communal award generating event is triggered based on one or more interactive game play events. In various embodiments, the communal award generating event is triggered based on the occurrence of one or more the competitive wagering events. In other embodiments, the communal award triggering event or qualifying condition is achieved by exceeding a certain amount of game play (such as a number of wagering or competitive wagering events, a number of wagers, a number of credits wagered, or an amount of time), or reaching a specified number of credits or points earned during the play of the interactive game.

In one embodiment, as discussed above, the gaming system determines the probability of the communal award earned or held by each player based on the initial wager amount placed by the player to play the interactive game. In other embodiments, the determination of the probability of the communal award earned or held by each player is based on the total number of wagers placed by the player during the play of the interactive game (e.g., the number of wager components placed by a player). In another embodiment, the determination of the probability of the communal award earned or held by each player is based on both an amount of an initial wager placed by the player to play the interactive game and the number of wagers placed by the player during the play of the interactive game. It should be appreciated that in various embodiments, the gaming system allocates or determines the probability of the communal award held or earned by that player based on a predetermined wagering threshold being met.

It should be appreciated that the interactive game described above can be any suitable interactive skill game or interactive partial skill game such as, an action game, a shooter game (e.g., the outer space shooting game described above), an action-adventure game, a vehicle simulation game, a sports game, a card game, a word game, an arcade-style game, or any other suitable type of game or combination of such suitable types of games. In one embodiment, the gaming machine and system include more than one interactive game. In one such embodiment, a player may choose which interactive game to play. In another embodiment, the gaming system selects which interactive game to play.

In various embodiments described herein, the gaming system is configured to include an interactive game in which a player shoots at an object. In one such embodiment described above, each wagering event occurs when a player shoots at an object. In another such embodiment described above, each wagering event occurs when a player shoots and destroys an object. It should be appreciated that in an interactive game in which each shot that a player takes at an object is a wagering event, the player of that game may not be able to take as many shots during the game as a different player playing an interactive game in which each shot that actually destroys an object is a wagering event. Thus, in an embodiment in which each wagering event occurs when a player shoots and destroys an object, the player of that game may be able to play the interactive game for a longer period of time and may perceive the game as more interactive and thus provide for a more enjoyable game playing experience. On the other hand, in an embodiment in which each wagering event occurs when a player shoots at an object, a player may perceive the game as more challenging and thus increase enjoyment for that player, particularly when the player has greater skill.

It should be appreciated that the interactive game may terminate in any suitable manner. In one embodiment, the interactive game terminates based on performance or input of the player. For example, if the player does not reach a certain goal, the interactive game ends. In this embodiment, a player who has a higher skill level will receive more wagering events and thus have the possibility of winning greater awards. In another embodiment, a player is allowed to play the interactive game as long as the player is funding the wager components. Therefore, the player has a chance of receiving a better interactive game outcome the longer the player continues to play the interactive game. In one such embodiment, when the player runs out of credits, instead of terminating the interactive game, the gaming system enables the player to insert more credits to continue play of the interactive game. For example, upon running out of credits, the gaming system provides the player a countdown of time to insert more credits to continue play of the interactive game In one embodiment, each wagering event in the interactive game is any suitable event or action that takes place in the interactive game that requires one or more inputs by a player. For example, in the embodiments described above, a player controls a spaceship and makes one or more inputs to try to shoot at one of the plurality of game elements or objects, such as an asteroid. The player shooting at an object in the outer space shooting interactive game described above constitutes a wagering event. It should be appreciated that the gaming machine may include any suitable number of wagering events.

In one embodiment, each competitive wagering event in the interactive game is any suitable event occurring between two players playing the interactive game in the competitive mode that requires one or more inputs made by at least one of the players and results in a determination of a winning player and a losing player (i.e., determines an outcome). For example, in various embodiments described above, a first player (e.g., player #1) makes one or more inputs to cause a spaceship to shoot at and hit another player's spaceship (e.g., player #2's spaceship). The gaming system in this embodiment determines that player #1 is the winning player because player #1 controlled their spaceship to shoot at and hit the spaceship controlled by player #2.

It should be appreciated that the outcomes and associated awards for the wagering events and the competitive wagering events may be determined in any suitable manner. In one embodiment, the outcomes and associated awards are determined via a paytable. In another embodiment, the outcomes and any associated awards are based on an amount of the wager placed for each wagering event or competitive wagering event. It should be appreciated that any of the awards provided in any embodiment disclosed herein can be any suitable award such as: (i) a number of credits; (ii) a number of free games; (iii) a number of activations or play of a bonus game; (iv) a number of selections for a game; (v) player tracking points; (vi) money, or (vii) any combination thereof.

It should be appreciated that in various embodiments two or more players can play in the interactive game in the competitive mode when the gaming system determines that those players are matching qualified players. Players can be regarded as matching qualified players based one or more conditions or characteristics such as the amount each player initially wagered to play the interactive game, an amount of each wager or portion of a wager placed for a competitive wagering event, or a number of wagering credits remaining for the interactive game. For example, in various embodiments described above, because each player selected the same wager component, the gaming system links the players such that each player can select to play the interactive game in a competitive mode. In other words, the players are matching qualified players because they selected the same wager component.

In various embodiments, the gaming system enables each of the players to select to play the interactive game in a competitive mode at any time during the play of the interactive game and in any suitable manner. In one embodiment, the gaming system enables each of the players to select to play the interactive game in the competitive mode by making one or more inputs on the player's gaming device. In various other embodiments, the gaming system enables a player to select to play the interactive game in the competitive mode if the player satisfies a designated condition. In one embodiment, the designated condition is a player having a predetermined number of wagering credits. If the player does not have the predetermined number of wagering credits, the gaming system does not enable that player to select to play the interactive game in the competitive mode or automatically disables the competitive mode for that player. In other embodiments, the designated condition is based on exceeding a certain amount of game play (such as number of games, number of credits, amount of time), or reaching a specified number of points or credits earned during game play.

In one embodiment including a communal award, the gaming system automatically disables a player's competitive mode if that player loses all of his earned sections of the communal award wheel or territories on the communal award galaxy map. In another embodiment including a communal award, the gaming system does not allow a player to select to play the game in the interactive mode if that player does not own any sections of the communal award wheel or any territories on the communal award galaxy map. In further embodiments with a communal award, the gaming system does not enable a player to disable or turn the competitive mode off once that player has selected to play the interactive game in the competitive mode.

It should be understood that various changes and modifications to the presently preferred embodiments described herein will be apparent to those skilled in the art. Such changes and modifications can be made without departing from the spirit and scope of the present disclosure and without diminishing its intended advantages. It is therefore intended that such changes and modifications be covered by the appended claims.

The invention is claimed as follows:

1. A gaming system comprising:

a plurality of gaming devices; and a controller configured to communicate with each of said gaming devices, said controller configured to operate with the plurality of gaming devices to:

(a) enable each of a plurality of players to play an interactive game in a non-competitive mode, (b) enable each of a plurality of players to play the interactive game in a competitive mode, and if a designated number of players are playing the interactive game in the competitive mode, said designated number being at least two, for a competitive event, which includes a competition between at least two of the plurality of players:

(i) determine a winning player of the competitive event, (ii) determine a losing player of the competitive event, (iii) cause said winning player to contribute a winning player portion toward a wager associated with the competitive event, the winning player portion being greater than zero, (iv) cause said losing player to contribute a losing player portion toward the wager associated with the competitive event, the losing player portion being greater than zero, the losing player portion less than the winning player portion, (v) randomly determine any award for the competitive event based in part on the wager, and (vii) provide any determined award to the winning player.

2. The gaming system of claim 1, wherein the controller is configured to operate with the plurality of gaming devices to enable each of said plurality of players to selectively play the interactive game in the competitive mode when a designated condition is satisfied.

3. The gaming system of claim 1, wherein the interactive game is a skill or partial skill based game.

4. The gaming system of claim 1, wherein the losing player can not win an award resulting from the competitive wagering event.

5. The gaming system of claim 1, wherein the plurality of gaming devices include a first gaming device and a second gaming device, and the plurality of players include a first player of the first gaming device and a second player of the second gaming device, the first gaming device enabling the first player to play the interactive game upon a first wager, the first wager including a first plurality of wager components, the second gaming device enabling the second player to play the interactive game upon a second wager, the second wager including a plurality of second wager components.

6. The gaming system of claim 5, wherein the winning player portion of the wager is a portion of one of the first plurality of wager components, and the losing player portion of the wager is a portion of one of the second plurality of wager components.

7. The gaming system of claim 1, wherein for each competitive event in the interactive game, one of said designated number of players makes one or more inputs resulting in a determination of the winning player and the losing player.

8. The gaming system of claim 7, for each competitive event, said one or more inputs resulting in the determination of the winning player and the losing player includes said one of the designated number of players controlling an object to shoot at and hit an object controlled by another of said designated number of players.

9. A gaming system comprising:

a plurality of gaming devices; and a controller configured to communicate with each of said gaming devices, said controller configured to operate with the plurality of gaming devices to:

(a) enable each of a plurality of players to play an interactive game in a non-competitive mode, (b) for each of the plurality of players, determine a player award probability of receiving a communal award, each of the player award probabilities associated with a numerical value, (c) enable each of the plurality of players to play the interactive game in a competitive mode, and if a designated number of players are playing the interactive game in the competitive mode, said designated number being at least two, for a competitive event, which includes a competition between at least two of the plurality of players:

(i) determine a winning player of the competitive event, (ii) determine a losing player of the competitive event, and (iii) cause a transfer of part of the losing player award probability to the winning player award probability for the competitive event, and (d) repeat c until an award generating triggering event occurs, (e) upon the occurrence of the award generating triggering event, select one of the plurality of players to provide the communal award, the probability of being said selected player to provide the communal award based on the player's award probability, and (f) provide the communal award to the selected player.

10. The gaming system of claim 9, wherein the controller is configured to operate with the plurality of gaming devices to randomly determine the part of the losing player award probability to transfer to the winning player award probability.

11. The gaming system of claim 9, wherein the controller is configured to operate with the plurality of gaming devices to, for each of the plurality of players, determine said player award probability based on an initial wager amount placed by the player to play the interactive game.

12. The gaming system of claim 9, wherein the controller is configured to operate with the plurality of gaming devices to determine an amount of the communal award based on a portion of each wager placed by each player to play the interactive game.

13. The gaming system of claim 9, wherein the controller is configured to operate with the plurality of gaming devices to enable each of said players to selectively play the interactive game in the competitive mode when a designated condition is satisfied.

14. The gaming system of claim 9, wherein the interactive game is a skill or partial skill based game.

15. A gaming system comprising:

a plurality of gaming devices; and a controller configured to communicate with each of said gaming devices, said controller configured to operate with the plurality of gaming devices to:

(a) enable each of a plurality of players to play an interactive game in a non-competitive mode, (b) enable each of a plurality of players to play the interactive game in a competitive mode, and if a designated number of players are playing the interactive game in the competitive mode, said designated number being at least two, for a competitive event, which includes a competition between at least two of the plurality of players:

(i) determine a winning player of the competitive event, (ii) determine a losing player of the competitive event, (iii) cause said winning player to contribute toward a wager associated with the competitive event, (iv) cause said losing player to contribute toward the wager associated with the competitive event, (v) randomly determine an award portion for the winning player based in part on the wager, (vi) randomly determine an award portion for the losing player based in part on the wager, the award portion for the losing player less than the award portion for the winning player, (vii) provide any award portion for the winning player to the winning player, and (viii) provide any award portion for the losing player to the losing player.

16. The gaming system of claim 15, wherein the controller is configured to operate with the plurality of gaming devices to cause said winning player to contribute an amount toward the wager associated with the wagering that is equal to an amount said losing player contributes toward the wager associated with the competitive wagering event.

17. The gaming system of claim 15, wherein the controller is configured to operate with the plurality of gaming devices to enable each of said plurality of players to selectively play the interactive game in the competitive mode when a designated condition is satisfied.

18. The gaming system of claim 15, wherein the interactive game is a skill or partial skill based game.

19. The gaming system of claim 15, wherein the plurality of gaming devices include a first gaming device and a second gaming device, and the plurality of players include a first player of the first gaming device and a second player of the second gaming device, the first gaming device enabling the first player to play the interactive game upon a first wager, the first wager including a first plurality of wager components, the second gaming device enabling the second player to play the interactive game upon a second wager, the second wager including a second plurality of wager components.

20. The gaming system of claim 15, wherein the winning player contribution toward the wager is one of the first plurality of wager components, and the losing player contribution toward the wager is one of the second plurality of wager components.

21. The gaming system of claim 15, wherein for each competitive event in the interactive game, one of said designated number of players makes one or more inputs resulting in the determination of the winning player and the losing player.

22. The gaming system of claim 21, wherein for each competitive event, said one or more inputs resulting in the determination of the winning player and the losing player includes said one of the designated number of players controlling an object to shoot at and hit an object controlled by another of said designated number of players.

* * * * *

UNITED STATES PATENT AND TRADEMARK OFFICE

CERTIFICATE OF CORRECTION

PATENT NO. : 8,313,368 B2
APPLICATION NO. : 12/709126
DATED : November 20, 2012
INVENTOR(S) : Cameron A. Filipour et al.

It is certified that error appears in the above-identified patent and that said Letters Patent is hereby corrected as shown below:

IN THE CLAIMS

In Claim 1, Column 38, Line 12, after “mode,” insert --and--.
In Claim 1, Column 38, Line 13, replace “a” with --the--.
In Claim 1, Column 38, Line 30, between “portion” and “less” insert --being--.
In Claim 1, Column 38, Line 34, replace “(vii)” with --(vi)--.
In Claim 4, Column 38, Line 44, replace “can not” with --cannot-- and delete “wagering”.
In Claim 7, Column 38, Line 63, replace “a” with --the--.
In Claim 8, Column 38, Line 65, between “7,” and “for” insert --wherein--.
In Claim 9, Column 39, Line 26, between “losing” and “player” insert --player’s--.
In Claim 9, Column 39, Line 27, between “winning” and “player” insert --player’s--.
In Claim 9, Column 39, Line 29, replace “c” with --(c)--.
In Claim 9, Column 39, Line 35, between “player’s” and “award” insert --player--.
In Claim 10, Column 39, Line 39, between “losing” and “player” insert --player’s--.
In Claim 10, Column 39, Line 40, between “winning” and “player” insert --player’s--.
In Claim 11, Column 39, Line 43, between “said” and “player” insert --player’s--.
In Claim 15, Column 39, Line 65, after “mode,” insert --and--.
In Claim 15, Column 40, Line 1, replace “a” with --the--.
In Claim 15, Column 40, Line 19, between “player” and “less” insert --being--.
In Claim 16, Column 40, Line 28, replace “wagering” with --competitive event--.
In Claim 16, Column 40, Line 30, delete “wagering”.
In Claim 20, Column 40, Line 49, replace “player” with --player’s--.
In Claim 20, Column 40, Line 50, replace “player” with --player’s--.

Signed and Sealed this
Fourteenth Day of May, 2013

Teresa Stanek Rea
*Acting Director of the United States Patent and Trademark Office*